(12) United States Patent
Tsuchiya et al.

(10) Patent No.: US 7,403,520 B2
(45) Date of Patent: *Jul. 22, 2008

(54) MULTICAST ROUTING METHOD AND APPARATUS FOR ROUTING MULTICAST PACKET

(75) Inventors: Kazuaki Tsuchiya, Ebina (JP); Hidemitsu Higuchi, Ebina (JP); Shinji Nozaki, Yokohama (JP); Sunao Sawada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 947 days.

This patent is subject to a terminal disclaimer.

(21) Appl. No.: 09/907,625

(22) Filed: Jul. 19, 2001

(65) Prior Publication Data

US 2002/0021697 A1 Feb. 21, 2002

(30) Foreign Application Priority Data

Jul. 21, 2000 (JP) .............................. 2000-220478

(51) Int. Cl.
*H04L 12/28* (2006.01)
(52) U.S. Cl. ..................... 370/390; 370/392; 370/401
(58) Field of Classification Search ................ 370/392, 370/390, 401, 465, 467, 466
See application file for complete search history.

(56) References Cited

U.S. PATENT DOCUMENTS

| | | | | |
|---|---|---|---|---|
| 5,793,763 | A | * | 8/1998 | Mayes et al. ................. 370/389 |
| 6,038,233 | A | * | 3/2000 | Hamamoto et al. .......... 370/401 |
| 6,170,022 | B1 | * | 1/2001 | Linville et al. ................. 710/29 |
| 6,708,219 | B1 | * | 3/2004 | Borella et al. ................ 709/245 |
| 6,795,917 | B1 | * | 9/2004 | Ylonen ........................ 713/160 |
| 6,853,639 | B1 | * | 2/2005 | Watanuki et al. ............. 370/390 |
| 2002/0075872 | A1 | * | 6/2002 | Ogawa et al. ................ 370/392 |

FOREIGN PATENT DOCUMENTS

| | | |
|---|---|---|
| JP | 10-136052 | 5/1998 |
| JP | 11-55319 | 2/1999 |
| JP | 11-252172 | 9/1999 |
| JP | 2000-134208 | 5/2000 |

* cited by examiner

*Primary Examiner*—Andrew C. Lee
(74) *Attorney, Agent, or Firm*—Mattingly, Stanger, Malur & Brundidge, PC

(57) ABSTRACT

A communications apparatus for converting an IPv4 multicast packet transmit from an IPv4 terminal into an IPv6 multicast packet and transmitting the converted IPv6 multicast packet to one of a plurality of IPv6 networks. The communications apparatus has information indicating to which IPv6 network the IPv4 multicast packet to undergo conversion processing is to be transmitted. The communications apparatus then converts the received IPv4 multicast packet into an IPv6 multicast packet and transmits the converted IPv6 multicast packet to an IPv6 network where it is required to be sent.

13 Claims, 23 Drawing Sheets

FIG. 2

IPv4 UNICAST ADDRESS TABLE 31

| ITEM NO. | IPv4 ADDRESS |
|---|---|
| 1 | 133. 144. 94. 100 |
| 2 | 133. 144. 94. 101 |
| . | . |
| . | . |
|  | 133. 144. 94. 200 |

FIG. 3

IPv6 UNICAST ADDRESS TABLE 32

| ITEM NO. | IPv6 ADDRESS |
|---|---|
| 1 | 4 : : 100 |
| 2 | 4 : : 101 |
| . | . |
| . | . |
|  | 4 : : 200 |

FIG. 4

IP ADDRESS CONVERSION TABLE 41

| ITEM NO. | IPv4 ADDRESS | IPv6 ADDRESS |
|---|---|---|
| 1 | 238.0.0.1 | ff1e::238.0.0.1 |
| 2 | 133.144.93.2 | 4::100 |
| 3 | 238.0.0.2 | ff1e::238.0.0.2 |
| 4 | 133.144.95.2 | 133.144.94.100 |
| ... | ... | ... |

FIG. 5

IP MULTICAST PATH INFORMATION TABLE 51

| ITEM NO. | IP MULTICAST ADDRESS | IP MULTICAST SERVER ADDRESS | OUTPUT INFORMATION | IPv4 OUTPUT | IPv6 OUTPUT |
|---|---|---|---|---|---|
| 1 | 238.0.0.1 | 133.144.93.2 | INTERFACE 8 | OFF | OFF |
| 2 | | | INTERFACE 9 | OFF | OFF |
| 3 | | | INTERFACE 10 | OFF | OFF |
| 4 | | | INTERFACE 11 | OFF | ON |
| ... | | | | | |

FIG. 6

IPv4 ADJOINING ROUTER INFORMATION TABLE ~71

| ITEM NO. | INTERFACE | ADJOINING ROUTER INFORMATION |
|---|---|---|
| 1 | INTERFACE 8 | OFF |
| 2 | INTERFACE 9 | OFF |
| 3 | INTERFACE 10 | OFF |
| 4 | INTERFACE 11 | OFF |
| ... | ... | |

IPv6 ADJOINING ROUTER INFORMATION TABLE

| ITEM NO. | INTERFACE | ADJOINING ROUTER INFORMATION |
|---|---|---|
| 1 | INTERFACE 8 | OFF |
| 2 | INTERFACE 9 | OFF |
| 3 | INTERFACE 10 | OFF |
| 4 | INTERFACE 11 | OFF |
| ... | ... | |

FIG. 8

IPv4 MULTICAST MEMBER INFORMATION TABLE 61

| ITEM NO. | IPv4 ADDRESS | REGISTERED MEMBER INFORMATION | |
|---|---|---|---|
| 1 | 238.0.0.2 | INTERFACE 8 | OFF |
| 2 | | INTERFACE 9 | ON |
| 3 | | INTERFACE 10 | OFF |
| 4 | | INTERFACE 11 | OFF |
| ... | ... | ... | |

IPv6 HEADER FORMAT

IPv4 HEADER FORMAT

MULTICAST ROUTING METHOD AND APPARATUS FOR ROUTING MULTICAST PACKET

CROSS-REFERENCE TO RELATED APPLICATION

This application relates to U.S. patent application Ser. No. 09/257003 filed on Feb. 25, 1999 based on Japanese Patent Application Number 10-046739 filed on Feb. 27, 1998 and U.S. patent application Ser. No. 09/614715 filed on Jul. 6, 2000 based on Japanese Patent Application Number 8-291480 and 9-212889 and U.S. patent application Ser. No. 09/421275 filed on Oct. 20, 1999 based on Japanese Patent Application Number 10-299613, all of which are assigned to the present assignee. The contents of those applications are incorporated herein by reference.

BACKGROUND OF THE INVENTION

The present invention relates to a multicast routing method and apparatus for routing a multicast packet and more particularly to a multicast routing method and apparatus for realizing multicast communication between an IPv4 terminal using IPv4 (Internet Protocol version 4) as a communication protocol and an IPv6 terminal using IPv6 (Internet Protocol version 6) as a communication protocol.

In recent years, it has been feared that the 32-bit address space on networks provided by the IPv4, if left alone, will soon be used up. To avoid the possible exhaustion of the address space, the IPv6, the next version of IPv4, has been developed and is drawing attention as a means for networking new terminals (for example, mobile IP terminals).

An example method for establishing communication between IPv4 terminals based on the IPv4 protocol and IPv6 terminals based on the IPv6 protocol is a technique disclosed in Japanese Patent Unexamined Publication No. 10-136052. The Japanese Patent Unexamined Publication No. 10-136052 describes that a DNS (Domain Name System) protocol extension technology incorporated into a device installed in a communication path generates an IP address conversion table that manages the correspondence between IPv4 addresses and IPv6 addresses and, based on the IP address conversion table, performs conversion between an IPv4 header and an IPv6 header. The use of this technology disclosed in the official gazette enables communication between IPv4 terminals and IPv6 terminals.

SUMMARY OF THE INVENTION

Although the technology described above can perform IP unicast communication between IPv4 terminals and IPv6 terminals, it cannot establish IP multicast communication between them. Here, it should be noted that the unicast signifies one-to-one communication and the multicast signifies communication from one source node to specified multiple destination nodes (communication within a particular group).

An object of the present invention is to provide a multicast routing method and apparatus which enables IPv6 terminals to receive an IPv4 multicast packet transmit from an IPv4 terminal and also enables IPv4 terminals to receive an IPv6 multicast packet transmit from an IPv6 terminal.

BRIEF DESCRIPTION OF THE DRAWINGS

FIG. 2 is a configuration diagram of an IPv4 unicast address table 31.

FIG. 3 is a configuration diagram of an IPv6 unicast address table 32.

FIG. 4 is a configuration diagram of an IP address conversion table 41.

FIG. 5 is a configuration diagram of an IP multicast path information table 51.

FIG. 6 is a configuration diagram of an IPv4 adjoining router information table 71.

FIG. 7 is a configuration diagram of an IPv6 adjoining router information table 72.

FIG. 8 is a configuration diagram of an IPv4 multicast member information table 61.

DESCRIPTION OF THE EMBODIMENTS

Now, embodiments of the present invention will be described in detail by referring to the accompanying drawings.

Figure 1:
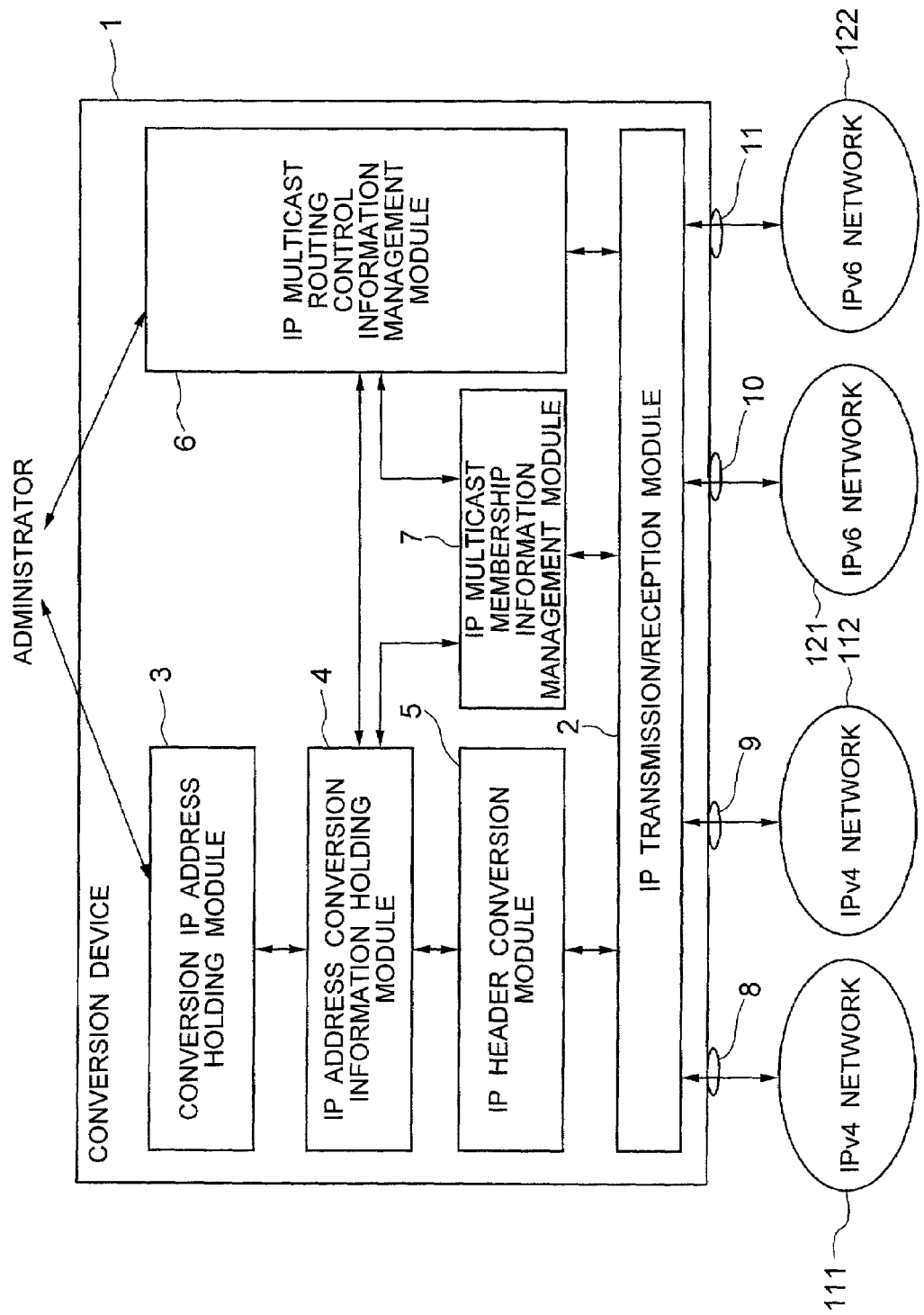
FIG. 1 is an example configuration diagram of a conversion device 1 according to the present invention.

FIG. 1 shows one example configuration of the conversion device 1 according to the invention. The conversion device 1 is connected, for example, to IPv4 networks 111, 112 and IPv6 networks 121, 122. The conversion device 1 establishes the IP multicast communication between the IPv4 terminals and the IPv6 terminals by performing an IP header conversion on an IPv4 multicast packet and an IPv6 multicast packet described later. The conversion device 1 has an IP transmission/reception module 2, a conversion IP address holding module 3, an IP address conversion information holding module 4, an IP header conversion module 5, an IP multicast routing control information management module 6, an IP multicast membership information management module 7, and interfaces 8-11. The interfaces 8-11 refer to points through which the IP transmission/reception module 2 is connected to the IPv4 networks 111, 112 and the IPv6 networks 121, 122.

The IP transmission/reception module 2 transmits/receives and routes the IPv4 packet to and from the IPv4 networks 111, 112 and also the IPv6 packet to and from the IPv6 networks 121, 122.

The conversion IP address holding module 3 holds IPv4 unicast addresses and IPv6 unicast addresses, both used for an IP header conversion described later. The IPv4 unicast addresses and the IPv6 unicast addresses to be used for the IP header conversion are entered into the conversion device 1 in advance by an administrator (or maintenance person) of the conversion device 1. Then, the IPv4 unicast addresses and the IPv6 unicast addresses are held in an IPv4 unicast address table 31 and an IPv6 unicast address table 32, respectively.

FIG. 2 shows a configuration of the IPv4 unicast address table 31. The IPv4 unicast address table 31 has the IPv4 unicast addresses for IP header conversion registered in advance according to the input from the administrator, for example. In FIG. 2, IPv4 addresses 133.144.94.100 to 133.144.94.200 are registered as an example.

FIG. 3 shows a configuration of the IPv6 unicast address table 32. The IPv6 unicast address table 32 has the IPv6 unicast addresses for IP header conversion registered in advance according to the input from the administrator, for example. In FIG. 3, IPv6 addresses 4::100 to 4::200 are registered as an example. The IPv4 unicast address table 31 and the IPv6 unicast address table 32 are held in the conversion IP address holding module 3.

The IP address conversion information holding module 4 has an IP address conversion table 41 which matches the IPv4 addresses and IPv6 addresses. The IP address conversion information holding module 4 matches IPv4 destination addresses of IPv4 multicast packets transmit by the IPv4 terminals to IPv6 multicast addresses that allow fixed data (IPv6 multicast prefix) to be added to the IPv4 destination addresses. The IP address conversion information holding module 4 also matches IPv4 source addresses of IPv4 multicast packets to IPv6 unicast addresses retrieved from the conversion IP address holding module 3 (if not retrieved yet, the IPv6 unicast addresses are retrieved). Further, the IP address conversion information holding module 4 matches IPv6 destination addresses of the IPv6 multicast packets transmit by the IPv6 terminals to IPv4 multicast addresses that allow the fixed data (IPv6 multicast prefix) to be removed from the IPv6 destination addresses. Further, IP address conversion information holding module 4 matches IPv6 source addresses of the IPv6 multicast packets to IPv4 unicast addresses retrieved from the conversion IP address holding module 3 (if not retrieved yet, the IPv4 unicast addresses are retrieved).

FIG. 4 shows a configuration of the IP address conversion table 41. The IP address conversion table 41 matches the IPv4 destination addresses of the received IPv4 multicast packets to the associated IPv6 multicast addresses (item No. 1 in FIG. 4, for example). The IP address conversion table 41 matches the IPv4 source addresses of the received IPv4 multicast packets to the associated IPv6 unicast addresses (item No. 2 in FIG. 4). The IP address conversion table 41 also matches the IPv6 destination addresses of the received IPv6 multicast packets to the corresponding IPv4 multicast addresses (item No. 3 in FIG. 4). Further, the IP address conversion table 41 matches the IPv6 source addresses of the received IPv6 multicast packets to the corresponding IPv4 unicast addresses (item No. 4 in FIG. 4).

The IP header conversion module 5 receives through the IP transmission/reception module 2 an IPv4 multicast packet sent to the conversion device 1 and performs the IP header conversion on the IPv4 multicast packet to generate an IPv6 multicast packet. Then, the IP header conversion module 5 sends the generated IPv6 multicast packet to the IP transmission/reception module 2. In the IP header conversion processing, the IP header conversion module 5 references the IP address conversion information holding module 4 to retrieve an IPv6 multicast address which is related with the IPv4 destination address of the IPv4 multicast packet. Then, the IP header conversion module 5 converts the IPv4 destination address of the IPv4 multicast packet into the retrieved IPv6 multicast address. Similarly, the IP header conversion module 5 converts an IPv4 source address of the IPv4 multicast packet into an IPv6 source address by referencing the IP address conversion information holding module 4 to retrieve an IPv6 address corresponding to the IPv4 source address and by using the retrieved IPv6 address.

Further, the IP header conversion module 5 receives through the IP transmission/reception module 2 an IPv6 multicast packet sent to the conversion device 1 and performs the IP header conversion on the IPv6 multicast packet to generate an IPv4 multicast packet. Then, the IP header conversion module 5 refers to the IP address conversion information holding module 4 to retrieve IPv4 addresses corresponding to the destination address and source address of the received IPv6 packet and then completes the conversion from the IPv6 addresses into the IPv4 addresses.

Figure 24A:
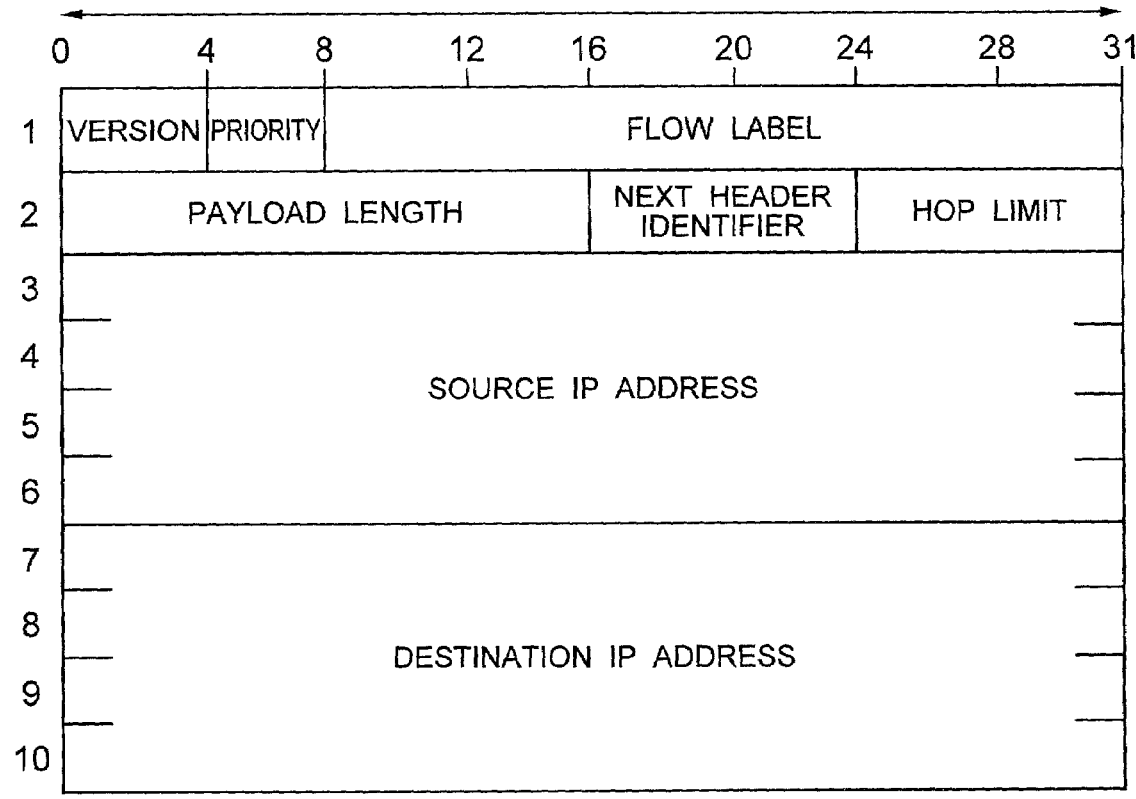
FIGS. 24A and 24B illustrate formats of an IPv6 header and an IPv4 header.

FIG. 24A shows an IPv6 header format. The IPv6 header format has the following fields. A "version" field stores "6" which represents the version number of IPv6. A "priority" field contains a priority level for the processing performed by routers to forward the packet in the network. A "flow label" field stores an identifier to be used, for example, in a priority control. A "payload length" field stores a length of data part in the packet from which IPv6 header part is removed. A "next header identifier" field stores an identifier indicating, for example, which upper layer protocol header follows the IPv6 header. A "hop limit" field stores the maximum number of times the packet can be transferred. A "source IP address" field stores source IP addresses and a "destination IP address" field stores destination IP addresses.

Figure 24B:
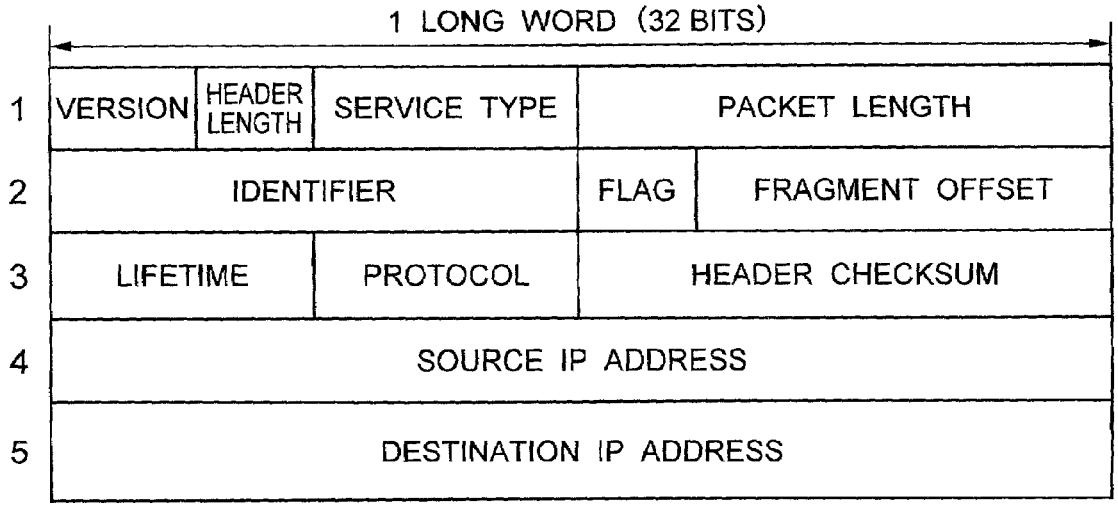

FIG. 24B shows an IPv4 header format. The IPv4 header format has the following fields. A "version" field stores "4" which represents the version number of IPv4. A "header length" field stores a length of the IPv4 header itself. A "service type" field stores information representing a quality of service provided in the communication processing. A "packet length" field stores an overall size of the packet comprised of the data block handled by the IP plus the IPv4 header. An "identifier" field stores an identifier used as reference information when transferring data to an upper layer. A "fragment offset" field stores control information on packet division. A "flag" field stores information indicating where in the original data the divided data (fragment) is located. A "lifetime" field stores the time in which the packet in question is allowed to exist in the network. A "protocol field" stores information indicating what the upper layer protocol is. A "header checksum" field stores a checksum of the IP header. Finally, a "source IP address" field contains source IP addresses and a "destination IP address" field contains destination IP addresses.

The IP header conversion module 5 performs conversion from IPv4 header into IPv6 header, shown in FIGS. 24A, 24B, or from IPv6 header into IPv4 header, and sets values in the fields in the converted IPv4 or IPv6 header format. In this embodiment, the following description concerning the IP header conversion processing in particular centers on the address conversion of the source IP address and the destination IP address, i.e., the conversion processing for the "IP source address" field and the "IP destination address" field.

Based on the IPv4 multicast routing control information and the IPv6 multicast routing control information described later, the IP multicast routing control information management module 6 determines routing destinations of the IPv4 multicast packet and the IPv6 multicast packet that the conversion device 1 received. The IPv4 multicast routing control information is exchanged with or collected from an IPv4 multicast router adjoining the conversion device 1 according to, for example, the IP multicast routing control protocol and is then held in the IP multicast routing control information management module 6. As the IP multicast routing control protocol, the PIM-DM (Protocol Independent Multicast, Dense Mode) protocol described in, for example, the RFC2362 and draft-ietf-pim-v2-dm-03.txt etc. may be used. Any other appropriate protocol may also be used.

The IPv4 multicast routing control information is updated by IPv4 multicast group member information notified to the IP multicast routing control information management module 6 from an IP multicast membership information management module 7 described later. Similarly, the IPv6 multicast routing control information is also exchanged with or collected from an IPv6 multicast router adjoining the conversion device 1. Then, the IPv6 multicast routing control information is updated by IPv6 multicast group member information notified to the IP multicast routing control information management module 6 from the IP multicast membership information management module 7. The IPv4 multicast routing control information and the IPv6 multicast routing control information are stored in the IP multicast path information table 51. The IP multicast path information table 51 is stored in the IP multicast routing control information management module 6 or any other appropriate memory.

FIG. 5 shows a configuration of the IP multicast path information table 51. The IP multicast path information table 51 holds information on the IP networks that are required to route the IP multicast packet transmit by the IP multicast server, in the form of whether the packet should be output or not for each of the interfaces 8-11. The IPv4 multicast routing control information refers to those of the information held in the IP multicast path information table 51 which have their IPv4 multicast addresses stored in the "IP multicast address" item. The IPv6 multicast routing control information refers to those of the information held in the IP multicast path information table 51 which have their IPv6 multicast addresses stored in the "IP multicast address" item.

FIG. 6 shows a configuration of the IPv4 adjoining router information table 71. The IPv4 adjoining router information table 71 holds information on IPv4 multicast routers adjoining the conversion device 1. In the example shown in FIG. 6, the information on the adjoining router is entered for each interface. For item number "1", the information on the adjoining router corresponding to the interface 8 is "OFF"; for item number "2", the information on the adjoining router corresponding to the interface 9 is "OFF"; for item number "3", the information on the adjoining router corresponding to the interface 10 is "OFF"; and for item number "4", the information on the adjoining router corresponding to the interface 11 is "OFF".

FIG. 7 shows a configuration of the IPv6 adjoining router information table 72. The IPv6 adjoining router information table 72 holds information on IPv6 multicast routers adjoining the conversion device 1. In the example shown in FIG. 7, the information on the adjoining router is entered for each interface. For item number "1", the information on the adjoining router corresponding to the interface 8 is "OFF"; for item number "2", the information on the adjoining router corresponding to the interface 9 is "OFF"; for item number "3", the information on the adjoining router corresponding to the interface 10 is "OFF"; and for item number "4", the information on the adjoining router corresponding to the interface 11 is "OFF".

In FIG. 6 and FIG. 7, the information on the adjoining router being "ON" means that an operational IPv4 or IPv6 multicast router exists on the network connected to the interface under consideration. The information on the adjoining router being "OFF" means that an operational IPv4 or IPv6 multicast router does not exist on the network connected to that interface.

According to an IPv4 multicast group membership protocol, such as the IGMP (Internet Group Management Protocol) protocol described in RFC (Request For Comments) 2236 of IETF (Internet Engineering Task Force), the IP multicast membership information management module 7 receives a request to participate in or leave the IPv4 multicast group, which was transmitted from an IPv4 terminal on the IPv4 network connected with the conversion device 1. Then, the IP multicast membership information management module 7 collects and manages the IPv4 multicast group member information within the IPv4 network directly connected to the conversion device 1 according to the request received and at the same time notifies the IPv4 multicast group member information to the IP multicast routing control information management module 6.

Further, according to an IPv6 multicast group membership protocol, such as the MLD (Multicast Listener Discovery) protocol described in the RFC 2710, the IP multicast membership information management module 7 receives a request to participate in or leave an IPv6 multicast group, which was transmitted from an IPv6 terminal on the IPv6 network connected to the conversion device 1. Then, the IP multicast membership information management module 7 collects and manages the IPv6 multicast group member information within the IPv6 network directly connected to the conversion device 1 according to the request received and at the same time notifies the IPv6 multicast group member information to the IP multicast routing control information management module 6.

FIG. 8 shows a configuration of the IPv4 multicast member information table 61 holding the IPv4 multicast group member information. The IPv4 multicast member information table 61 holds information on the IPv4 network to which an IPv4 terminal participating in the IPv4 multicast address to be header-converted by the conversion device 1 belongs. In the example shown in FIG. 8, the information on registered members is entered for each interface with an IPv4 multicast address (238.0.0.2). In item number "1", the registered member information for the interface 8 is "OFF"; in item number "2", the registered member information for the interface 9 is "ON"; in item number "3", the registered member information for the interface 10 is "OFF"; and in item number "4", the registered member information for the interface 11 is "OFF". The registered member information being "ON" means that an IPv4 terminal participating in the IPv4 multicast address exists on the network connected to that interface. The registered member information being "OFF" means that there are no such IPv4 terminals. Hence, in FIG. 8, the IPv4 multicast packet with the destination address (238.0.0.2) is received by the IPv4 terminal on the network 112 connected to the interface 9.

Figure 9:
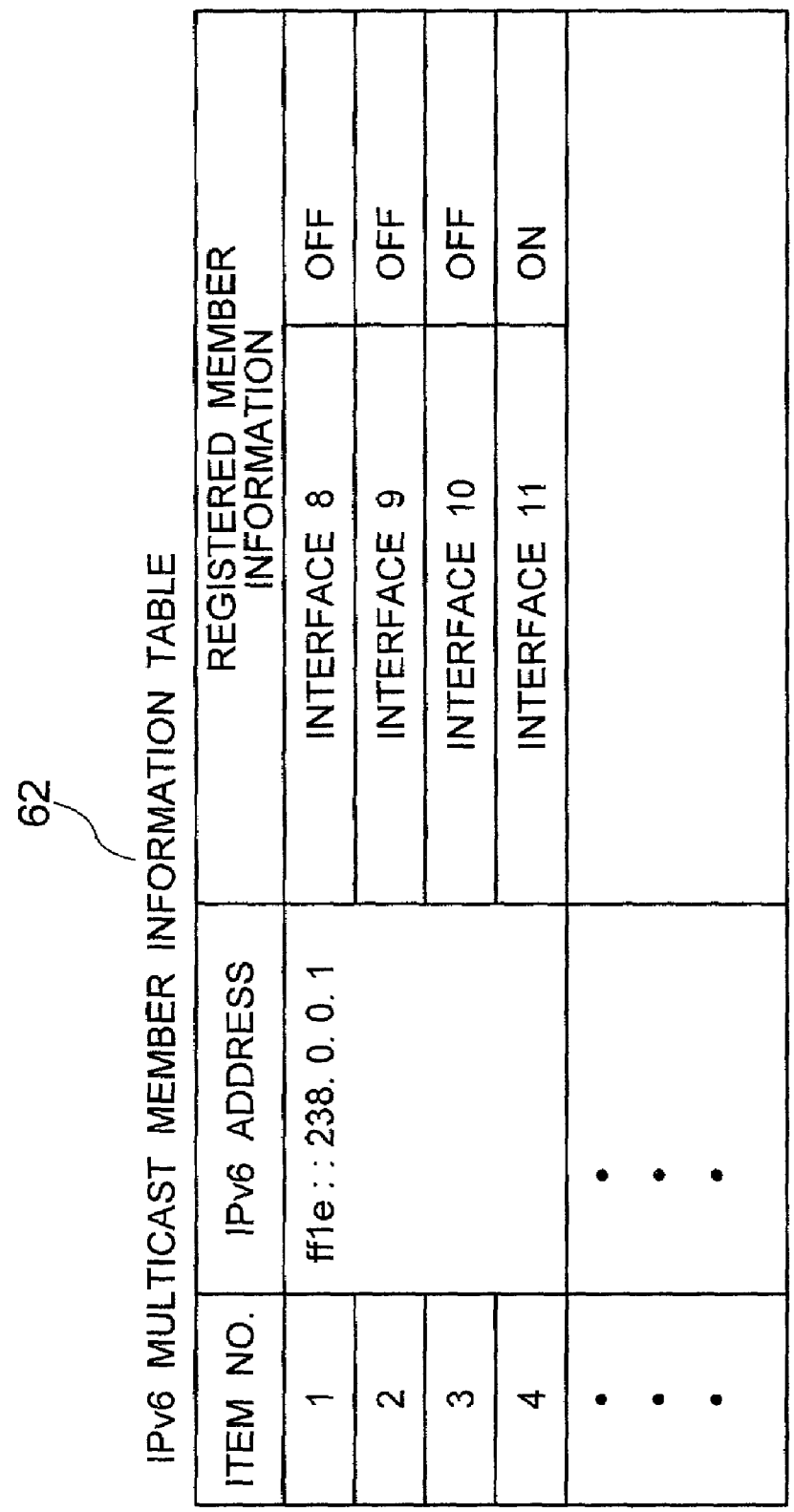
FIG. 9 is a configuration diagram of an IPv6 multicast member information table 62.

FIG. 9 shows a configuration of the IPv6 multicast member information table 62 holding the IPv6 multicast group member information. The IPv6 multicast member information table 62 holds information on the IPv6 network to which an IPv6 terminal participating in the IPv6 multicast address to be header-converted by the conversion device 1 belongs. In the example shown in FIG. 9, the information on registered members is entered for each interface with an IPv6 multicast address (ff1e::238.0.0.1). In item number "1", the registered member information for the interface 8 is "OFF"; in item number "2", the registered member information for the interface 9 is "OFF"; in item number "3", the registered member information for the interface 10 is "OFF"; and in item number "4", the registered member information for the interface 11 is "ON". The registered member information being "ON" means that an IPv6 terminal participating in the IPv6 multicast address exists on the network connected to that interface. The registered member information being "OFF" means that there are no such IPv6 terminals. Hence, in FIG. 9, the IPv6 multicast packet with the destination address (ff1e:: 238.0.0.1) is received by the IPv6 terminal on the network 122 connected to the interface 11, for example, an IPv6 multicast client 104.

Figure 23:
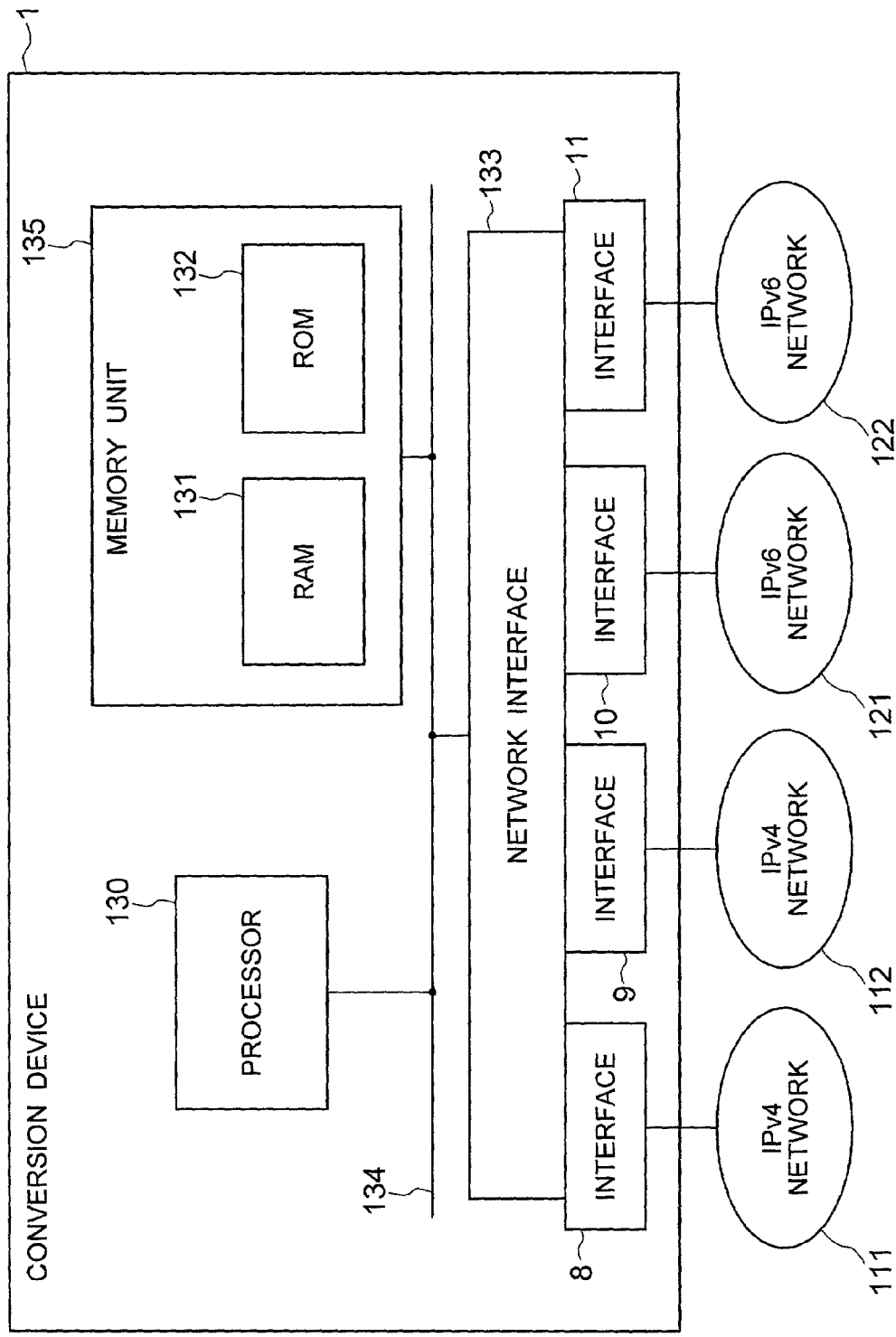
FIG. 23 is an example of hardware configuration diagram for the conversion device 1 according to the invention.

FIG. 23 shows an example hardware configuration of the conversion device of FIG. 1. In FIG. 23, the conversion device 1 has a network interface 133 for establishing connection with the IPv4 networks 111, 112 and IPv6 networks 121, 122, a memory unit 135 including, for example, RAM131 and ROM132, and a processor 130 for executing a program stored in the memory unit 135 and processing various data stored in the memory unit 135. The network interface 133, the memory unit 135 and the processor 130 are interconnected via a bus 134. The conversion device 1 may also have other storage devices such as a hard disk drive as the memory unit in addition to RAM 131 and ROM 132. In that case, the hard disk drive is not necessarily connected to the bus 134.

The IP transmission/reception module 2 shown in FIG. 1 comprises the network interface 133 for sending and receiving IP (Internet Protocol) packets, a program stored in the memory unit 135 to operate the IP transmission/reception module 2, and the processor 130 for executing the program, all shown in FIG. 23. Rather than being controlled by the processor 130, the network interface 133 may have a separate processor and a separate memory unit therein to send or receive packets to and from the IPv4 network 101 and IPv6 network 102. The network interface 133 in FIG. 23 establishes connection with individual networks through the interfaces 8-11. These interfaces 8-11 are physical connections or logical network identification information used by the conversion device 1. The IP transmission/reception module 2 uses these interfaces 8-11 to identify the individual networks connected to the interfaces 8-11.

The conversion IP address holding module 3, the IP address conversion information holding module 4, the IP header conversion module 5, the IP multicast routing control information management module 6 and the IP multicast membership information management module 7 shown in FIG. 1 each have their own program for their operation and their own processor 130 for executing the program.

Figure 10:
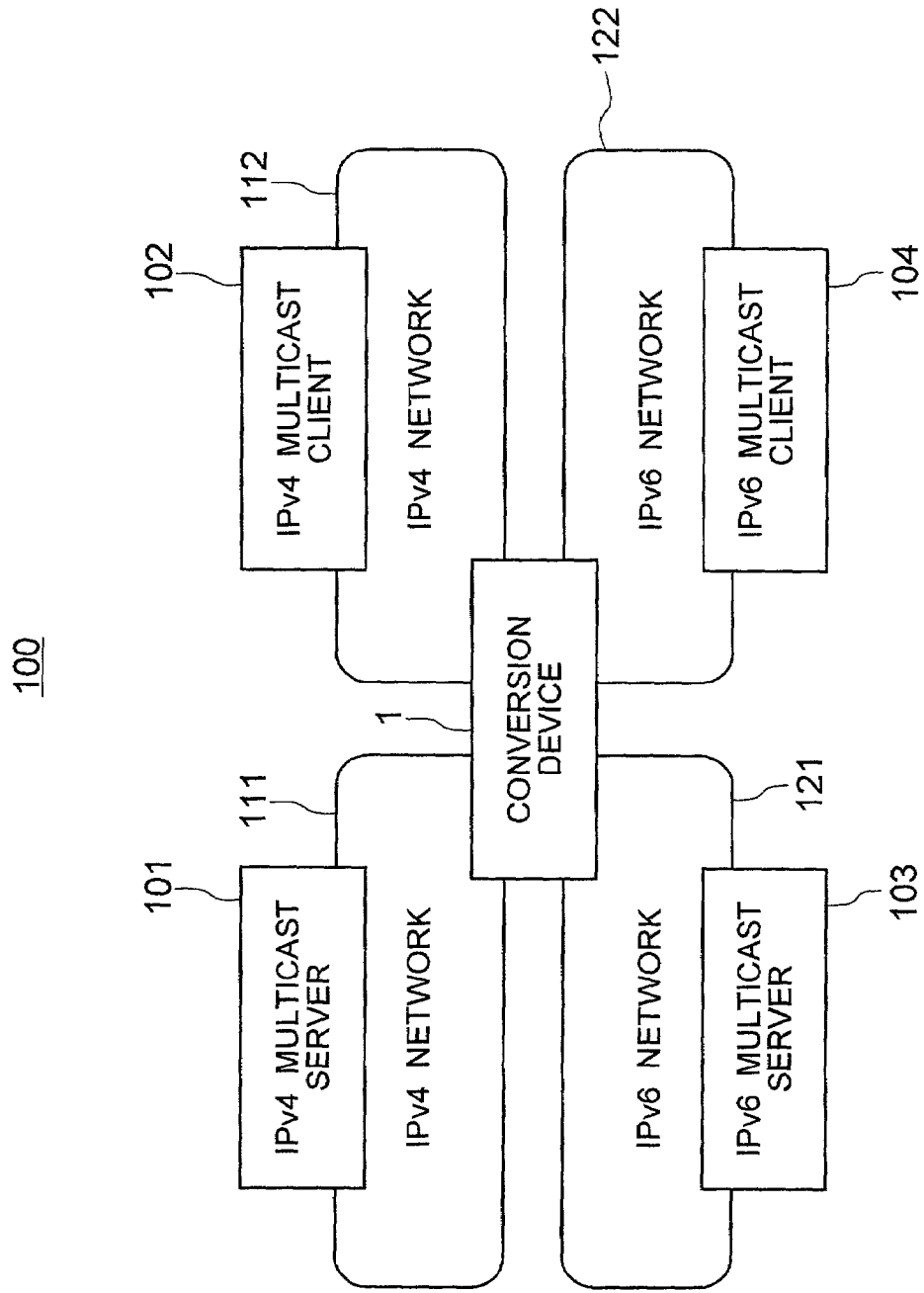
FIG. 10 is a configuration diagram showing a communications network system 100 using the conversion device 1 according to the present invention.

FIG. 10 shows a configuration of a communications network system 100 using the conversion device 1 according to this invention. The communications network system 100 is connected to the IPv4 networks 111, 112 and the IPv6 networks 121, 122 through the conversion device 1 (IPv4 addresses: 133.144.93.1 and 133.144.95.1 and IPv6 addresses: 1::1 and 2::1 are allocated, for example). In the IPv4 network 111 there is an IPv4 multicast server 101 (IPv4 address: 133.144.93.2) for transmitting IPv4-compatible multicast packets. In the IPv4 network 112 there is an IPv4 multicast client 102 (IPv4 address: 133.144.95.2) for receiving IPv4-compatible multicast packets. In the IPv6 network 121 there is an IPv6 multicast server 103 (IPv6 address: 1::2) for transmitting IPv6-compatible multicast packets. In the IPv6 network 122 there is an IPv6 multicast client 104 (IPv6 address: 2::2) for receiving IPv6-compatible multicast packets.

It is assumed that the IPv4 multicast server 101 is transmitting an IPv4 multicast packet (IPv4 address: 238.0.0.1) to the IPv4 network 111 and that the IPv6 multicast server 103 is transmitting an IPv6 multicast packet (IPv6 address: ff1e:: 238.0.0.2) to the IPv6 network 121. Although in FIG. 10 the IPv4 networks 111, 112 and the IPv6 networks 121, 122 are shown to be completely physically separate from each other, they may be physically mixed in the same network.

Next, in this communications network system 100, we will explain about a case where the IPv4 multicast server 101 transmits the IPv4 multicast packet (IPv4 address: 238.0.0.1) to the IPv4 network 111 and the IPv6 multicast client 104 receives the IPv4 multicast packet.

First, let us explain about the processing (steps 201-204) periodically performed by the conversion device 1 according to the IGMP (Internet Group Management Protocol) protocol, the MLD (Multicast Listener Discovery) protocol and the PIM-DM protocol.

Figure 12:
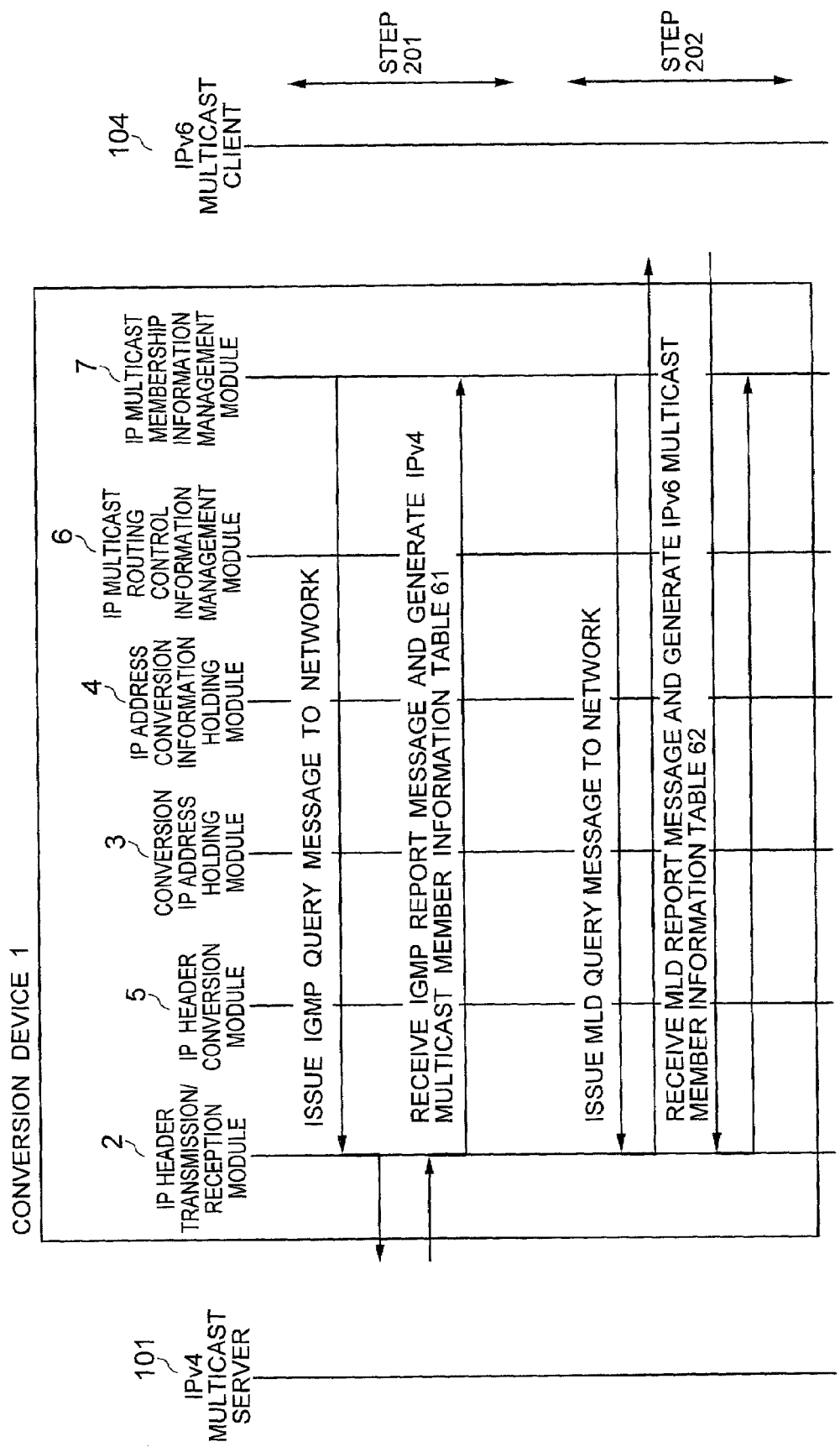
FIG. 12 is a communication sequence diagram for steps 201, 202.

FIG. 12 is a communication sequence diagram for steps 201, 202. First, step 201 will be described. The IP multicast membership information management module 7 generates an IGMP Query message according to the IGMP protocol and at the same time instructs the IP transmission/reception module 2 to send the IGMP Query message to the IPv4 networks 111, 112. Then, the IP transmission/reception module 2 puts the IGMP Query message out on the IPv4 networks 111, 112. The IGMP Query message is a message which has one of the IPv4 multicast addresses used by an arbitrary IPv4 multicast group specified before being sent out. The terminals participating in the IPv4 multicast group receive the IGMP Query message and return an IGMP Report message thus reporting that there are members of the IPv4 multicast group using the IPv4 multicast address.

Conversely, when the IP transmission/reception module 2 receives an IGMP Report message dispatched by an IPv4 multicast client through the IPv4 network 111 or 112, it transfers the IGMP Report message to the IP multicast membership information management module 7. The IP multicast membership information management module 7 analyzes the IGMP Report message according to the IGMP protocol and generates an IPv4 multicast member information table 61. That is, in the IPv4 multicast member information table 61, for the entries whose "IPv4 addresses" are the IPv4 multicast group address requested by the IGMP Report message to participate, an interface listed in the registered member information which is connected to the network where the IPv4 multicast client that has returned the IGM Report message exists is set to "ON". In this stage of explanation, however, it is assumed that on the IPv4 networks 111, 112 there are no members in the IPv4 multicast group using the IPv4 multicast address specified by the IGMP Query message. Hence, the IP transmission/reception module 2 does not receive this IGMP Report message.

Next, step 202 is explained. IP multicast membership information management module 7 generates an MLD Query message according to the MLD protocol and instructs the IP transmission/reception module 2 to send the generated MLD Query message out to the IPv6 networks 121, 122. Then, the IP transmission/reception module 2 puts the MLD Query message out on the IPv6 networks 121, 122. The MLD Query message is a message which has one of the IPv6 multicast addresses used by an arbitrary IPv6 multicast group specified before being sent out. The terminals participating in the IPv6 multicast group receive the MLD Query message and return an MLD Report message thus reporting that there are members of the IPv6 multicast group using the IPv6 multicast address.

Conversely, when the IP transmission/reception module 2 receives an MLD Report message dispatched by an IPv6 multicast client through the IPv6 network 121 or 122, it transfers the MLD Report message to the IP multicast membership information management module 7. The IP multicast membership information management module 7 analyzes the IGMP Report message according to the MLD protocol and generates an IPv6 multicast member information table 62. That is, in the IPv6 multicast member information table 62, for the entries whose "IPv6 addresses" are the IPv6 multicast group address requested by the MLD Report message to participate, an interface listed in the registered member information which is connected to the network where the IPv6 multicast client that has returned the MLD Report message exists is set to "ON". In this stage of explanation, however, it is assumed that on the IPv6 networks 121, 122 there are no members in the IPv6 multicast group using the IPv6 multicast address specified by the MLD Query message. Hence, the IP transmission/reception module 2 does not receive this MLD Report message.

Figure 13:
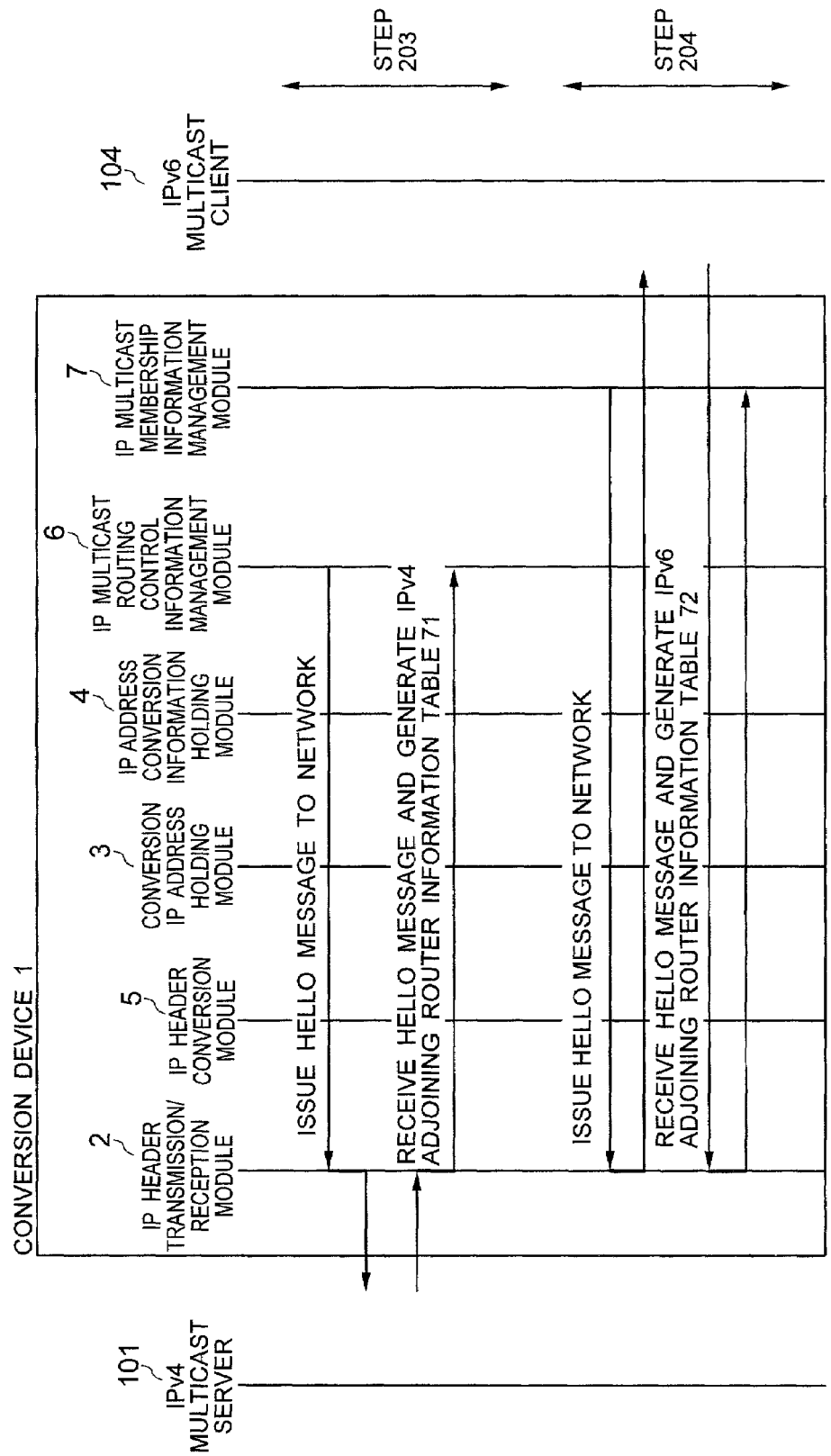
FIG. 13 is a communication sequence diagram for steps 203, 204.

FIG. 13 is a communication sequence diagram for steps 203, 204. First, step 203 will be described. The IP multicast routing control information management module 6 generates a Hello message according to the PIM-DM protocol and instructs the IP transmission/reception module 2 to send the Hello message out to the IPv4 networks 111, 112. Then, the IP transmission/reception module 2 puts the Hello message out on the IPv4 networks 111, 112.

Conversely, when the IP transmission/reception module 2 receives a Hello message dispatched by an IPv4 multicast router through the IPv4 network 111 or 112, it transfers the Hello message to the IP multicast routing control information management module 6. The IP multicast routing control information management module 6 analyzes the Hello message according to the PIM-DM protocol and generates an IPv4 adjoining router information table 71. That is, the adjoining router information for the interface that has received the Hello message is set to "ON". In this stage of explanation, however, it is assumed that on the IPv4 network 111 or 112 there are no IPv4 multicast routers. Hence, the IP transmission/reception module 2 does not receive this Hello message.

Next, step 204 will be described. The IP multicast routing control information management module 6 generates a Hello message according to the PIM-DM protocol and instructs the IP transmission/reception module 2 to send the generated Hello message out to the IPv6 networks 121, 122. Then, the IP transmission/reception module 2 sends the Hello message out to the IPv6 networks 121, 122.

Conversely, when the IP transmission/reception module 2 receives a Hello message dispatched by an IPv6 multicast router through the IPv6 network 121 or 122, it transfers the Hello message to the IP multicast routing control information management module 6. The IP multicast routing control information management module 6 analyzes the Hello message according to the PIM-DM protocol and generates an IPv6 adjoining router information table 72. That is, the adjoining router information for the interface that has received the Hello message is set to "ON". In this stage of explanation, however, there are no IPv6 multicast routers on the IPv6 network 121 or 122. Hence, the IP transmission/reception module 2 does not receive this Hello message.

By performing these steps 201-204, the conversion device 1 now knows the states of the multicast clients and routers on the networks connected thereto. Then, the conversion device 1 sends the received multicast packet to the networks requiring the multicast packet.

Next, in the communications network system 100, we will describe a case where the IPv6 multicast client 104 is not a member of the IPv6 multicast group (ff1e: :238.0.0.1).

First, let us explain about the processing performed by the conversion device 1 which has received an IPv4 multicast packet (destination: 238.0.0.1) sent from the IPv4 multicast server 101 out to the IPv4 network 111.

Figure 14:
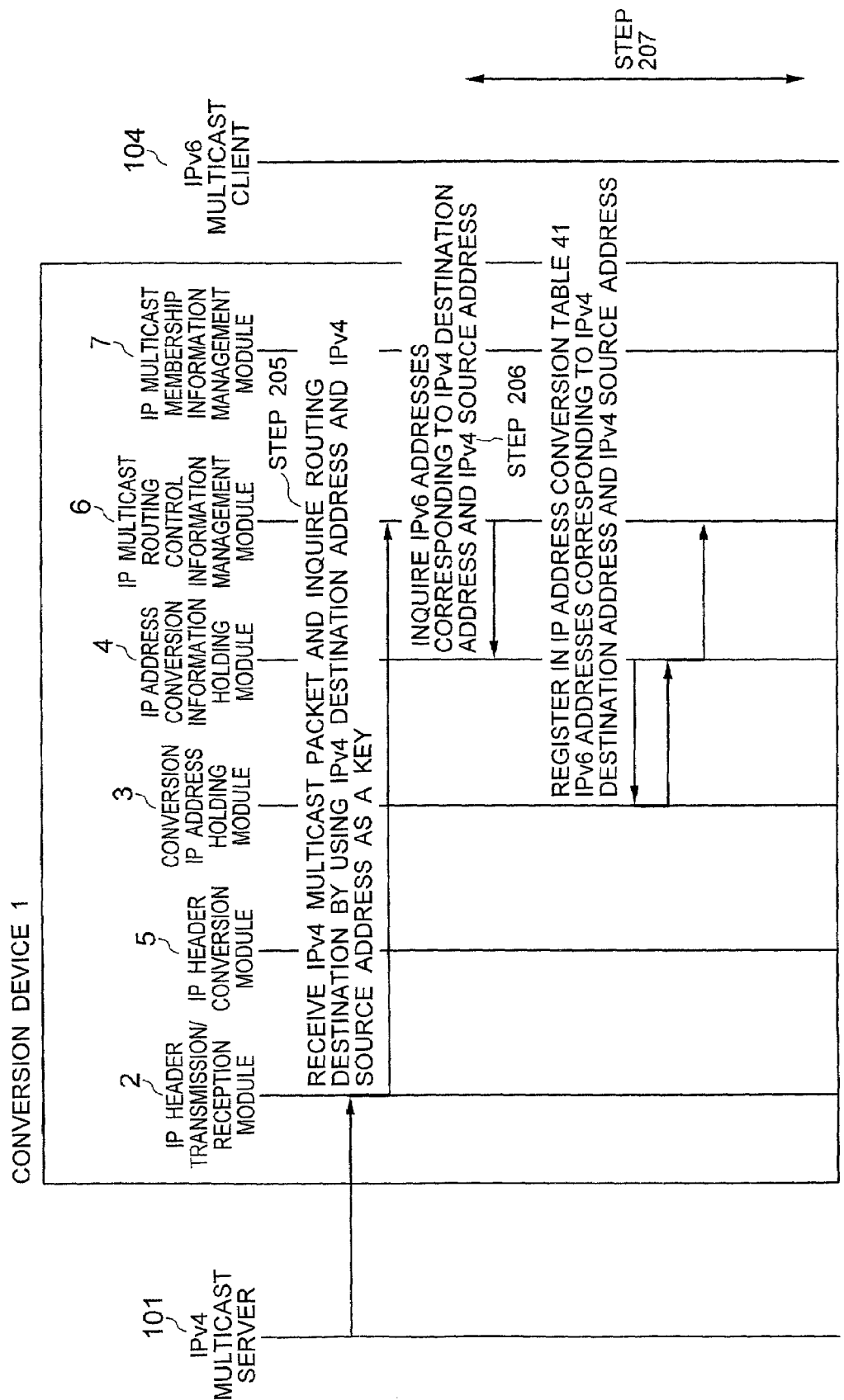
FIG. 14 is a communication sequence diagram for steps 205-207.

FIG. 14 is a communication sequence diagram for steps 205-207. First, step 205 will be described. The IP transmission/reception module 2 receives an IPv4 multicast packet (destination: 238.0.0.1) from the IPv4 network 111. Then, the IP transmission/reception module 2 inquires of the IP multicast routing control information management module 6 the routing destination of the IPv4 multicast packet (IPv4 output information and IPv6 output information) by using the IPv4 destination address (=IP multicast address=238.0.0.1) and the IPv4 source address (=IP multicast server address=133.144.93.2) of the received IPv4 multicast packet as a query key.

Next, step 206 of FIG. 14 will be explained. The IP multicast routing control information management module 6 that received an inquiry now refers to the IP address conversion information holding module 4 for the IPv6 addresses corresponding to the IPv4 destination address and the IPv4 source address.

Next, step 207 of FIG. 14 will be explained. The IP address conversion information holding module 4 checks whether the inquired IPv4 destination address is registered in the IP address conversion table 41 and, if the corresponding IPv6 multicast address is already registered, reports that IPv6 multicast address to the source of inquiry (in this case, the IP multicast routing control information management module 6). When the IPv6 multicast address is found not registered, the IP address conversion information holding module 4 matches the IPv4 destination address to the IPv6 multicast address (ff1e::238.0.0.1) which is produced by adding fixed data, for example an IPv6 multicast prefix=ff1e::/96, to the IPv4 destination address and then registers the combination in the IP address conversion table 41. Then, the IP address conversion information holding module 4 reports the IPv6 multicast address (ff1e::238.0.0.1) to the IP multicast routing control information management module 6.

The IP address conversion information holding module 4 also checks whether the IPv4 destination address is registered in the IP address conversion table 41 and, if the corresponding IPv6 unicast address is already registered, reports that IPv6 unicast address to the source of inquiry (in this case, the IP multicast routing control information management module 6). When the IPv6 unicast address is not registered, the IP address conversion information holding module 4 retrieves an IPv6 unicast address from the conversion IP address holding module 3, matches it with the IPv4 source address and then registers the combination in the IP address conversion table 41. Then, the IP address conversion information holding module 4 reports the IPv6 unicast address to the IP multicast routing control information management module 6. In this stage of explanation, it is assumed that the IPv4 source address (133.144.93.2) is not registered in the IP address conversion table 41. Therefore, the IP address conversion information holding module 4 retrieves an IPv6 unicast address (4::100) from the conversion IP address holding module 3, matches it with the IPv4 source address (133.144.93.2) and registers this combination in the IP address conversion table 41. Then, the IP address conversion information holding module 4 reports the IPv6 unicast address to the IP multicast routing control information management module 6.

Figure 15:
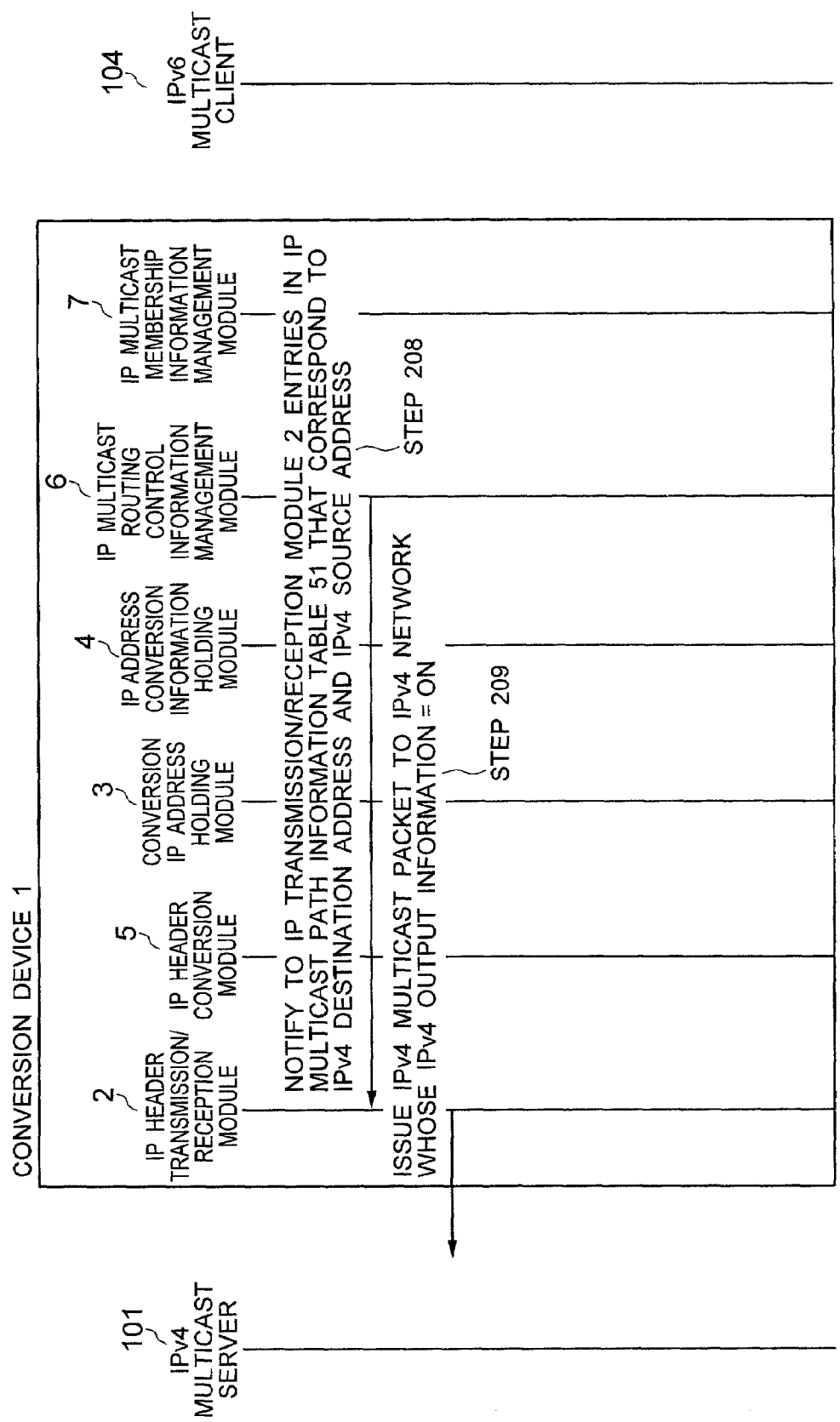
FIG. 15 is a communication sequence diagram for steps 208, 209.

FIG. 15 is a communication sequence diagram for steps 208, 209. First, step 208 will be described. The IP multicast routing control information management module 6 searches through the IP multicast path information table 51 by using as a query key the IPv4 destination address (IPv4 multicast address: 238.0.0.1) and the IPv4 source address (IPv4 multicast server address: 133.144.93.2) given by the IP transmission/reception module 2. When the search finds the corresponding entry in the IP multicast path information table 51, the IP multicast routing control information management module 6 notifies a packet outputting interface and a protocol kind of the network connected to that interface as output information to the IP transmission/reception module 2. When on the other hand the corresponding entry is not found in the IP multicast path information table 51, the IP multicast routing control information management module 6 generates entries whose IP multicast address is (238.0.0.1) and IP multicast server address is (133.144.93.2) described above.

Here, we will explain about the procedure for setting the output information about the entries in the IP multicast path information table 51 which is to be notified to the IP transmission/reception module 2, i.e., the information on the multicast packet outputting interface and on the protocol. The times when the IPv4 output information or IPv6 output information about the IP multicast path information table 51 is set by using the table information as described below are when setting an initial value in the IP multicast path information table 51 at times of starting the conversion device 1 or when adding a new IP multicast address in the IP multicast path information table 51 and setting an initial value in the table.

For an interface for which the adjoining router information in the IPv4 adjoining router information table 71 is set to "ON", the IP multicast routing control information management module 6 sets the IPv4 output information in the IP multicast path information table 51 to "ON". Similarly, for an interface for which the adjoining router information in the IPv6 adjoining router information table 72 is set to "ON", the IP multicast routing control information management module 6 sets the IPv6 output information in the IP multicast path information table 51 to "ON".

Next, the IP multicast routing control information management module 6 refers to the IPv4 multicast member information table 61 to determine an interface whose IPv4 address is (238.0.0.1) and whose registered member information is set to "ON", and then sets the IPv4 output information in the IP multicast path information table 51 corresponding to that interface to "ON". Similarly, the IP multicast routing control information management module 6 refers to the IPv6 multicast member information table 62 to determine an interface whose IPv6 address is (ff1e::238.0.0.1) and whose registered member information is set to "ON", and then sets the IPv6 output information in the IP multicast path information table 51 corresponding to that interface to "ON".

Further, the IP multicast routing control information management module 6 sets to "OFF" the IPv4 output information in the IP multicast path information table 51 corresponding to the interface that has received the IPv4 multicast packet. The IP multicast routing control information management module 6 also sets to "OFF" the IPv4 output information and the IPv6 output information in the IP multicast path information table 51 for the remaining interfaces. In this stage of explanation, the IP multicast routing control information management module 6 notifies to the IP transmission/reception module 2 the output information in the IP multicast path information table 51 in which the IPv4 output information for all interfaces is "OFF" and the IPv6 output information for all interfaces is "OFF".

Next, step 209 will be explained. The IP transmission/reception module 2 sends an IPv4 multicast packet out to the IPv4 network that is connected to the interface whose IPv4 output information given by the IP multicast routing control information management module 6 is set to "ON". In this stage of explanation, because the IPv4 output information notified to the IP transmission/reception module 2 is set to "OFF" for all interfaces, the IPv4 multicast packet is not sent out to any of the IPv4 networks.

Figure 16:
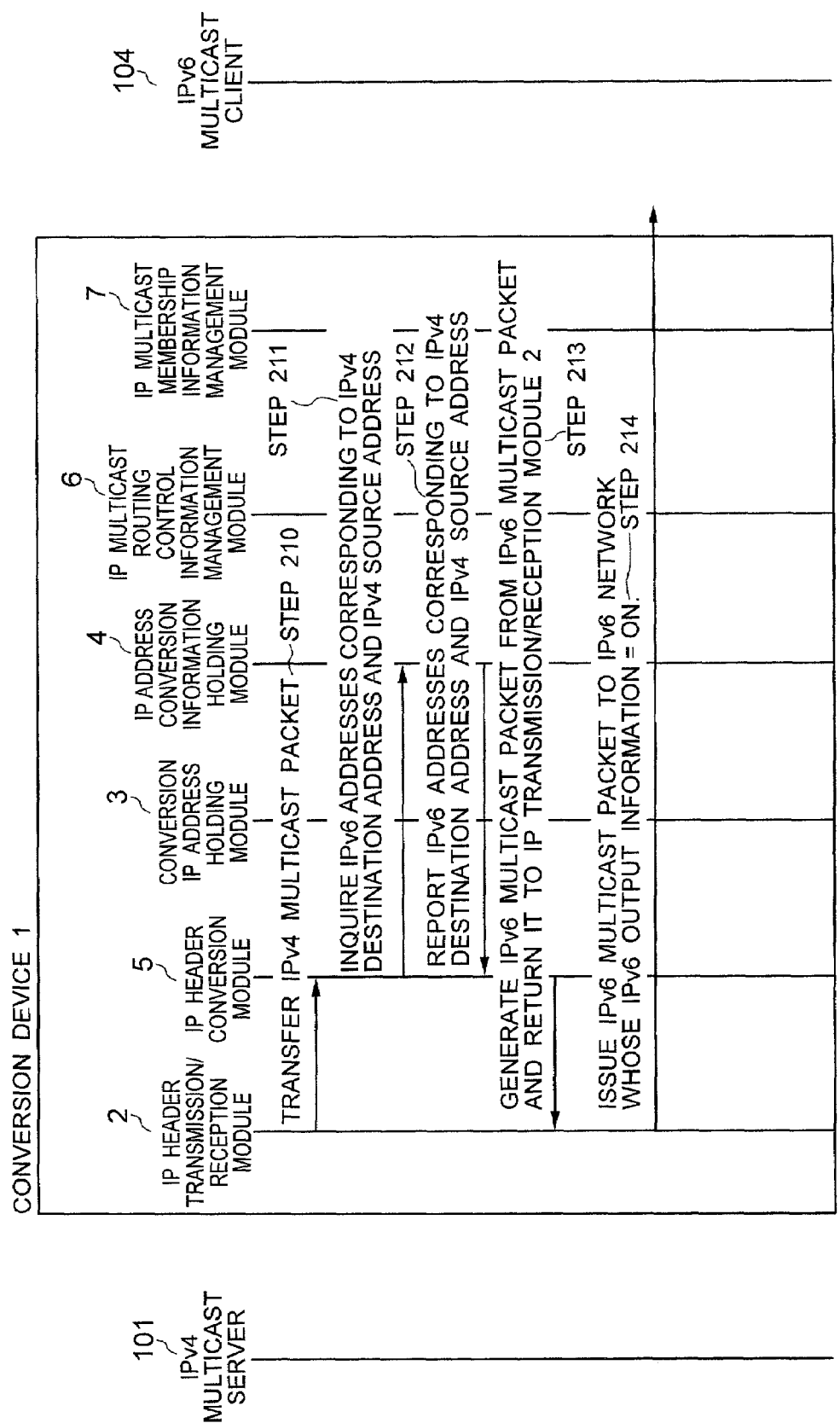
FIG. 16 is a communication sequence diagram for steps 210-214.

FIG. 16 is a communication sequence diagram for steps 210-214. In step 210, the IP transmission/reception module 2 transfers the IPv4 multicast packet received to the IP header conversion module 5.

In step 211, the IP header conversion module 5 refers to the IP address conversion information holding module 4 for IPv6 addresses corresponding to the IPv4 destination address and IPv4 source address of the IPv4 multicast packet.

In step 212, the IP address conversion information holding module 4 retrieves IPv6 addresses corresponding to the IPv4 destination address and IPv4 source address from the IP address conversion table 41 according to (step 207) and reports them to the source of inquiry (here, the IP header conversion module 5).

In step 213, the IP header conversion module 5 uses the IPv6 multicast address corresponding to the IPv4 destination address that was reported from the IP address conversion information holding module 4 to convert the IPv4 destination address of the IPv4 multicast packet to the IPv6 multicast address. Similarly, the IP header conversion module 5 uses the IPv6 address corresponding to the IPv4 source address to convert the IPv4 source address to an IPv6 unicast address. This IP header conversion processing generates an IPv6 multicast packet and returns the generated IPv6 multicast packet to the IP transmission/reception module 2.

In step 214, the IP transmission/reception module 2 sends the generated IPv6 multicast packet out to the IPv6 network connected to the interface whose IPv6 output information given by the IP multicast routing control information management module 6 in (step 208) is set to "ON". In this stage of explanation, because the IPv6 output information notified is set to "OFF" for all interfaces, the IPv6 multicast packet is not sent to any of the IPv6 networks.

Next, a case will be described in which the IPv6 multicast client 104 becomes a member of the IPv6 multicast group (ff1e::238.0.0.1).

The IPv6 multicast client 104 generates an MLD Report message for participating in the IPv6 multicast group (ff1e::238.0.0.1) according to the MLD protocol and sends it to the IPv6 network 122. The processing performed by the conversion device 1 that has received the MLD Report message from the IPv6 network 122 will be described in the following.

Figure 17:
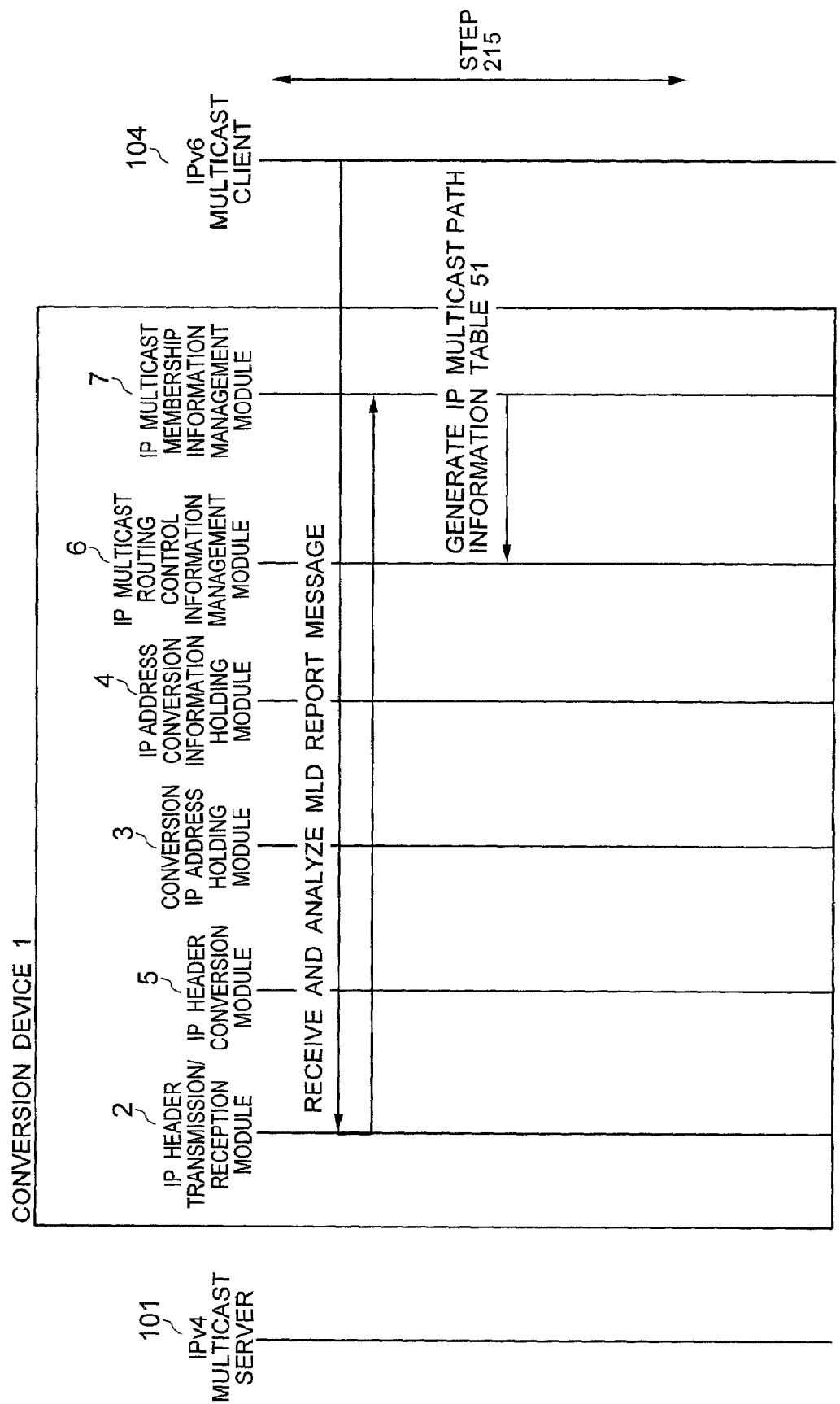
FIG. 17 is a communication sequence diagram for step 215.

FIG. 17 is a communication sequence diagram for step 215. In step 215, first, the IP transmission/reception module 2 transfers the received MLD Report message to the IP multicast membership information management module 7. The IP multicast membership information management module 7 analyzes the MLD Report message according to the MLD protocol to generate an IPv6 multicast member information table 62. Then, the IP multicast membership information management module 7 notifies the information obtained through the analysis of the MLD Report message to the IP multicast routing control information management module 6. The IP multicast routing control information management module 6 generates the IP multicast path information table 51 based on the analyzed information of the notified MLD message.

In this stage of explanation, it is found from the received MLD message that a member of the IPv6 multicast group (ff1e::238.0.0.1) exists in the IPv6 network 122. Hence, according to the instruction from the IP multicast membership information management module 7, the interface 11 in the IPv6 multicast member information table 62 with an IPv6 address of (ff1e::238.0.0.1) is set to "ON" and the interface 11 in the IP multicast path information table 51 with an IPv6 address of (ff1e::238.0.0.1) is set to "ON". At this time, the IP multicast path information table 51 may have a plurality of entries with the IPv6 address of (ff1e::238.0.0.1) depending on whether there are differing IP multicast server addresses. In that case, the plurality of interfaces 11 in these entries in the IPv6 multicast member information table 62 and the IP multicast path information table 51 are set to "ON".

Next, we will describe the processing performed after (step 215) by the conversion device 1 when it receives the IPv4 multicast packet (destination: 238.0.0.1) dispatched from the IPv4 multicast server 101. It is noted that the processing performed by the conversion device 1 following (step 215) is done by repeating the above-described steps 205-214. The details are given in the following.

The IP transmission/reception module 2 executes (step 205) to refer to the IP multicast routing control information management module 6 for IPv4 output information and IPv6 output information representing the routing destination of the received IPv4 multicast packet. The IP multicast routing control information management module 6 performs (step 206) to refer to the IP address conversion information holding module 4 for IPv6 addresses corresponding to the IPv4 destination address and IPv4 source address.

The IP address conversion information holding module 4 performs (step 207) to retrieve the IPv6 addresses corresponding to the IPv4 destination address and IPv4 source address of the IPv4 multicast packet and reports them to the source of inquiry (here, IP multicast routing control information management module 6). In this stage of explanation, the IPv6 multicast address (ff1e::238.0.0.1) corresponding to the IPv4 destination address (238.0.0.1) and the IPv6 unicast address (4::100) corresponding to the IPv4 source address (133.144.93.2) are reported to the IP multicast routing control information management module 6.

The IP multicast routing control information management module 6 performs (step 208) to notify to the IP transmission/reception module 2 the information on the interface for outputting the IPv4 multicast packet and on the protocol of the network connected to that interface. In this stage of explanation, the IP multicast routing control information management module 6 reports to the IP transmission/reception module 2 the output information in which the IPv4 output information for all interfaces is "OFF", the IPv6 output information for the interface 11 is "ON" and the IPv6 output information for the remaining interfaces is "OFF".

The IP transmission/reception module 2 performs (step 209) to issue the IPv4 multicast packet to the IPv4 network connected to the interface whose IPv4 output information is set to "ON". In this stage of explanation, because the IPv4 output information is set to "OFF" for all interfaces, the IPv4 multicast packet is not issued to any of the IPv4 networks.

Next, the IP transmission/reception module 2, the IP address conversion information holding module 4 and the IP header conversion module 5 perform (steps 210-213) to generate an IPv6 multicast packet from the IPv4 multicast packet.

The IP transmission/reception module 2 performs (step 214) to issue the generated IPv6 multicast packet to the IPv6 network connected to the interface whose IPv6 output information notified by the IP multicast routing control information management module 6 in (step 208) is set to "ON". In the explanation of this embodiment, because the IPv6 output information of the interface 11 is set to "ON", the IPv6 multicast packet is sent out to the IPv6 network 122 connected to the interface 11. The IPv6 multicast client 104 receives the IPv6 multicast packet dispatched from the conversion device 1 through the IPv6 network 122.

This allows the multicast packet transmit by the IPv4 multicast server 101 to the IPv4 network 111 to be received by the IPv6 multicast client 104 on the IPv6 network 122.

Next, a case will be described in which the IPv6 multicast client 104 leaves the IPv6 multicast group (ff1e::238.0.0.1).

The IPv6 multicast client 104 generates an MLD Done message for leaving the IPv6 multicast group of (ff1e::238.0.0.1) and sends it to the IPv6 network 122. Then, the IPv6 multicast client 104 that has dispatched the MLD Done message no longer receives a IPv6 multicast packet with a destination address of (ff1e::238.0.0.1) until it dispatches the MLD Report message again.

Figure 18:
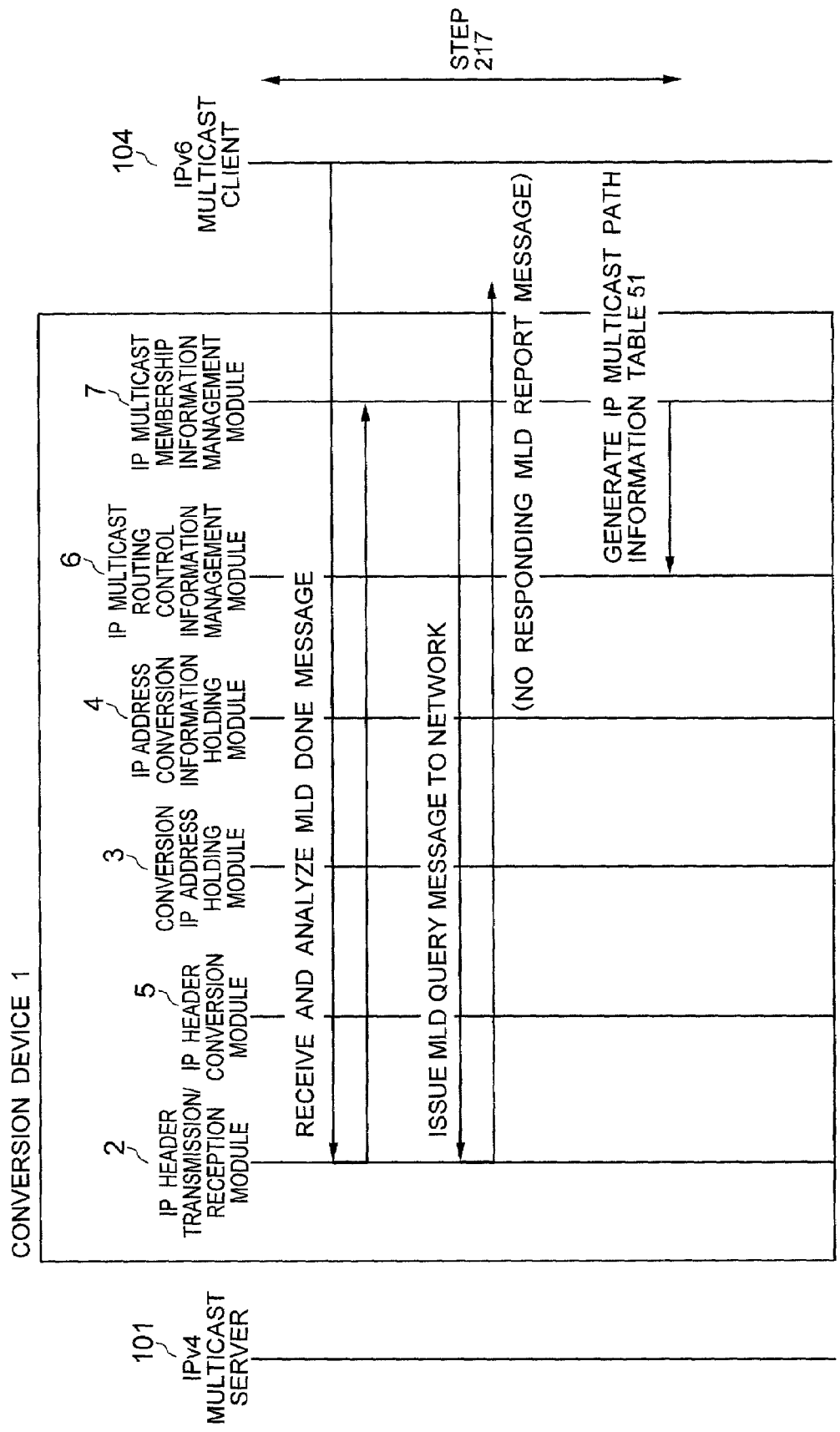
FIG. 18 is a communication sequence diagram for step 217.

Here, the processing performed by the conversion device 1 that has received the MLD Done message from the IPv6 network 122 will be explained. FIG. 18 is a communication sequence diagram for step 217. In step 217, the IP transmission/reception module 2 transfers the received MLD Done message to the IP multicast membership information management module 7. Upon receiving the MLD Done message, the IP multicast membership information management module 7 generates an MLD Query message for checking the existence of any member of the IPv6 multicast group with a multicast address of (ff1e::238.0.0.1) and instructs the IP transmission/reception module 2 to dispatch the MLD Query message to the IPv6 network 122. The IP transmission/reception module 2 then dispatches the MLD Query message to the IPv6 network 122.

If in the IPv6 network 122 there are other members of the IPv6 multicast group, these members in response to the MLD Query message put out their MLD Report messages on the IPv6 network 122 within a predetermined period of time. In this case, the IP transmission/reception module 2 transfers these MLD Report messages to the IP multicast membership information management module 7. The IP multicast membership information management module 7 thus recognizes that other members of the IPv6 multicast group still exist on the IPv6 network 122. Then, the IP multicast membership information management module 7 discards the MLD Done message and continues transmitting the IPv6 multicast packet of (ff1e::238.0.0.1) to the IPv6 network 122 without performing the processing described later.

If there are no other members of the IPv6 multicast group, no MLD Report message indicating the participation in the IPv6 multicast group is put on the IPv6 network 122 even with the elapse of a predetermined time. In this case, the IP multicast membership information management module 7 generates an IPv6 multicast member information table 62 according to the MLD Done message and notifies the information obtained through the analysis of the MLD Done message to the IP multicast routing control information management module 6. The IP multicast routing control information management module 6 generates the IP multicast path information table 51 according to the analysis information of the notified MLD Done message.

That is, with the MLD Done message received and a series of subsequent steps performed, it is found that members of the IPv6 multicast group (ffle::238.0.0.1) no longer exist on the IPv6 network 122. So, the interface 11 in the IPv6 multicast member information table 62 with an IPv6 address of (ff1e::238.0.0.1) is set to "OFF" and the interface 11 in the IP multicast path information table 51 with an IPv6 address of (ff1e::238.0.0.1) is set to "OFF". The IP multicast path information table 51 may have two or more entries with the IPv6 address of (ff1e::238.0.0.1) depending on whether there are differing IP multicast server addresses. In that case, the plurality of interfaces 11 in these entries are set to "OFF".

Next, the processing performed after (step 217) by the conversion device 1 when it receives the IPv4 multicast packet (destination: 238.0.0.1) dispatched by the IPv4 multicast server 101 onto the IPv4 network 111 will be described. It is noted that the processing done by the conversion device 1 following (step 217) is performed by repeating the above-described steps 205-214. This is detailed as follows.

The IP transmission/reception module 2 performs (step 205) to refer to the IP multicast routing control information management module 6 for the IPv4 output information and IPv6 output information representing the routing destination of the IPv4 multicast packet. The IP multicast routing control information management module 6 performs (step 206) to refer to the IP address conversion information holding module 4 for IPv6 addresses corresponding to the IPv4 destination address and IPv4 source address.

The IP address conversion information holding module 4 performs (step 207) to report the IPv6 addresses corresponding to the IPv4 destination address and IPv4 source address of the IPv4 multicast packet to the source of inquiry (in this case, IP multicast routing control information management module 6). In this stage of explanation, the IPv6 multicast address (ff1e::238.0.0.1) corresponding to the IPv4 destination address (238.0.0.1) and the IPv6 unicast address (4::100) corresponding to the IPv4 source address (133.144.93.2) are reported.

The IP multicast routing control information management module 6 performs (step 208) to notify to the IP transmission/reception module 2 the information on the interface for outputting the IPv4 multicast packet and on the protocol of the network connected to that interface. In this stage of explanation, the IP multicast routing control information management module 6 notifies to the IP transmission/reception module 2 the output information in which the IPv4 output information for all interfaces is "OFF" and the IPv6 output information for all interfaces is "OFF".

The IP transmission/reception module 2 performs (step 209) to dispatch the IPv4 multicast packet to the IPv4 network connected to the interface whose IPv4 output information is set to "ON". In this stage of explanation, because the IPv4 output information in the IP multicast path information table 51 is set to "OFF" for all interfaces, the IPv4 multicast packet is not dispatched to any of the IPv4 networks.

Next, the IP transmission/reception module 2, the IP address conversion information holding module 4 and the IP header conversion module 5 perform (steps 210-213) to generate an IPv6 multicast packet from the received IPv4 multicast packet.

The IP transmission/reception module 2 performs (step 214) to dispatch the generated IPv6 multicast packet to the IPv6 network connected to the interface whose IPv6 output information notified by the IP multicast routing control information management module 6 in (step 208) is set to "ON". In this stage of explanation, because the IPv6 output information for all interfaces in the IP multicast path information table 51 is set to "OFF", the generated IPv6 multicast packet is not sent out to any of the IPv6 networks.

Figure 11:
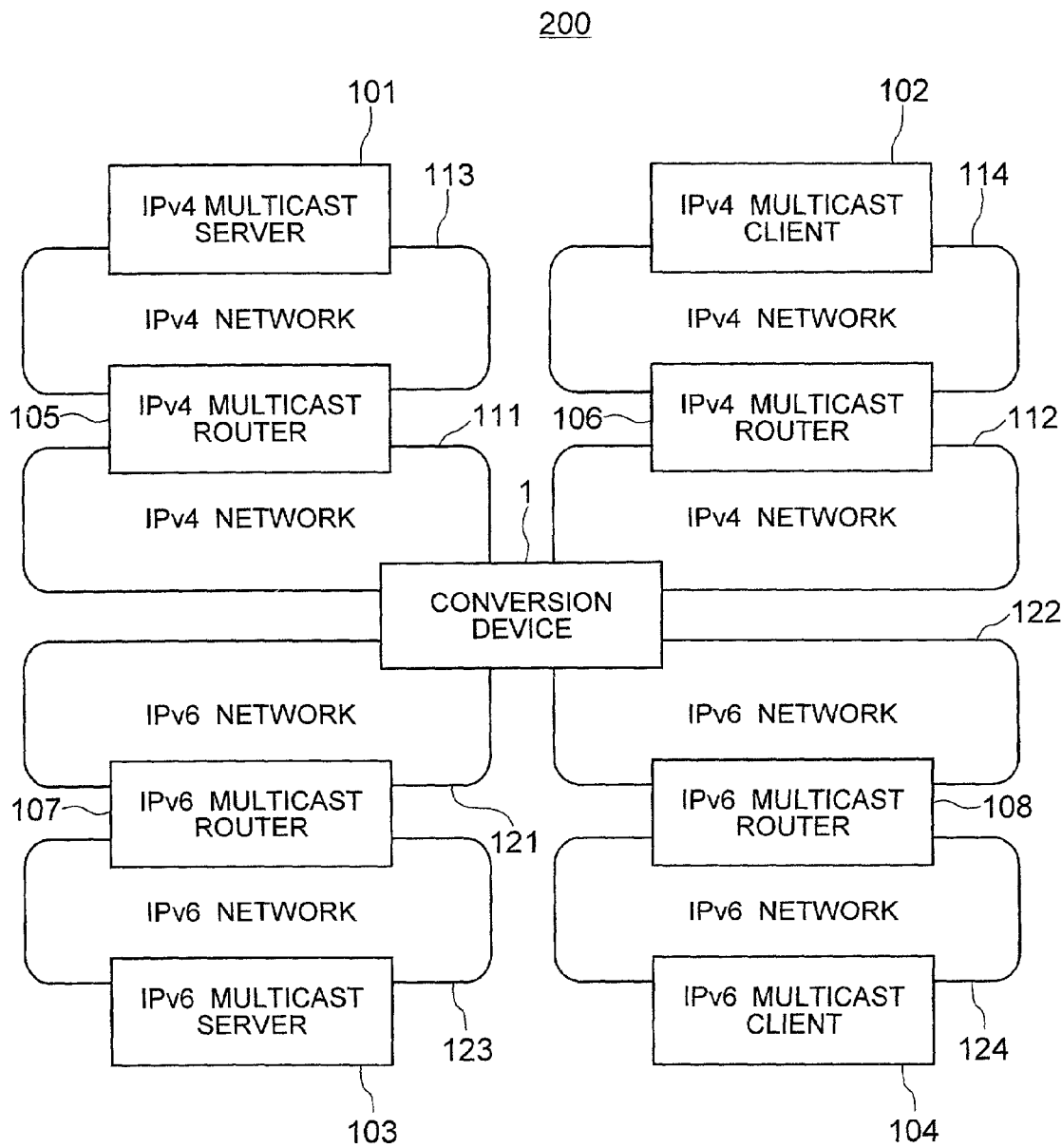
FIG. 11 is a configuration diagram showing a communications network system 200 using the conversion device 1 according to the present invention.

FIG. 11 shows a configuration of a communications network system 200 using the conversion device 1 according to this invention. The communications network system 200 is connected to the IPv4 networks 111, 112 and the IPv6 networks 121, 122 through the conversion device 1 (IPv4 addresses: 133.144.97.1 and 133.144.98.1 and IPv6 addresses: 7::1 and 8::1 are allocated, for example). Further, an IPv4 multicast router 105 interconnects IPv4 networks 111 and 113, and an IPv4 multicast router 106 interconnects IPv4 networks 112 and 114. An IPv6 multicast router 107 interconnects IPv6 networks 121 and 123, and an IPv6 multicast router 108 interconnects IPv6 networks 122 and 124.

In the IPv4 network 113 there is an IPv4 multicast server 101 (IPv4 address: 133.144.93.2) for transmitting IPv4-compatible multicast packets. In the IPv4 network 114 there is an IPv4 multicast client 102 (IPv4 address: 133.144.95.2) for receiving IPv4-compatible multicast packets. In the IPv6 network 123 there is an IPv6 multicast server 103 (IPv6 address: 1::2) for transmitting IPv6-compatible multicast packets. In the IPv6 network 124 there is an IPv6 multicast client 104 (IPv6 address: 2::2) for receiving IPv6-compatible multicast packets.

It is assumed that the IPv4 multicast server 101 is transmitting an IPv4 multicast packet (destination address: 238.0.0.1) to the IPv4 network 113 and that the IPv6 multicast server 103 is transmitting an IPv6 multicast packet (destination address: ff1e::238.0.0.2) to the IPv6 network 123.

In this communications network system 200, we will describe a case where the IPv4 multicast server 101 transmits an IPv4 multicast packet (IPv4 multicast address: 238.0.0.1) to the IPv4 network 113 and the IPv6 multicast client 104 receives the IPv4 multicast packet. As to the processing that overlaps those in the communications network system 100 described above, some explanations will be omitted so as not to make the discussion redundant.

First, let us explain about the processing (steps 201-204) periodically performed by the conversion device 1 according to the IGMP protocol, the MLD protocol and the PIM-DM protocol.

The IP multicast membership information management module 7 performs (step 201) to generate an IPv4 multicast member information table 61. In this stage of explanation, because there are no members of the IPv4 multicast group on the IPv4 networks 111, 112, the conversion device 1 does not receive an IGMP Report message. The IP multicast membership information management module 7 also performs (step 202) to generate an IPv6 multicast member information table 62. In this stage of explanation, because there are no members of the IPv6 multicast group on the IPv6 networks 121, 122, the conversion device 1 does not receive an MLD Report message.

The IP multicast routing control information management module 6 performs (step 203) to generate an IPv4 adjoining router information table 71. Here, the IPv4 adjoining router information table 71 is generated based on the information contained in a Hello message received from the IPv4 multicast routers 105, 106. That is, the IP multicast routing control information management module 6 sets to "ON" the adjoining router information in those entries in the IPv4 adjoining router information table 71 that correspond to the interfaces 8, 9 connected to the IPv4 networks 111, 112 where the IPv4 multicast routers 105, 106 exist.

The IP multicast routing control information management module 6 performs (step 204) to generate the IPv6 adjoining router information table 72. Here, the IPv6 adjoining router information table 72 is generated based on the information contained in a Hello message received from the IPv6 multicast routers 107, 108. That is, the IP multicast routing control information management module 6 sets to "ON" the adjoining router information in those entries in the IPv6 adjoining router information table 72 that correspond to the interfaces 10, 11 connected to the IPv6 networks 121, 122 where the IPv6 multicast routers 107, 108 exist.

Next, a case where the IPv6 multicast client 104 is not a member of the IPv6 multicast group (ff1e::238.0.0.1) will be described.

First, the IPv4 multicast server 101 issues an IPv4 multicast packet (destination: 238.0.0.1) to the IPv4 network 113. The IPv4 multicast router 105 routes this IPv4 multicast packet to the IPv4 network Here, we will explain the processing performed by the conversion device 1 that has received the IPv4 multicast packet from the IPv4 network 111.

The IP transmission/reception module 2 performs (step 205) to refer to the IP multicast routing control information management module 6 for IPv4 output information and IPv6 output information representing the routing destination of the IPv4 multicast packet. The IP multicast routing control information management module 6 performs (step 206) to refer to the IP address conversion information holding module 4 for IPv6 addresses corresponding to the IPv4 destination address and IPv4 source address.

The IP address conversion information holding module 4 performs (step 207) to retrieve the IPv6 addresses corresponding to the IPv4 destination address and IPv4 source address of the IPv4 multicast packet and reports them to the source of inquiry (here, IP multicast routing control information management module 6). In this stage of explanation, the IPv6 multicast address (ff1e::238.0.0.1) corresponding to the IPv4 destination address (238.0.0.1) and the IPv6 unicast address (4::100) corresponding to the IPv4 source address (133.144.93.2) are reported to the IP multicast routing control information management module 6.

The IP multicast routing control information management module 6 performs (step 208) to notify to the IP transmission/reception module 2 the information on the interface for outputting the IPv4 multicast packet and on the protocol of the network connected to that interface. In this stage of explanation, because the IPv4 output information for the interface 9 and the IPv6 output information for the interfaces 10 and 11 in the IP multicast path information table 51 are "ON", these output information is notified from the IP multicast routing control information management module 6 to the IP transmission/reception module 2.

The IP transmission/reception module 2 performs (step 209) to issue the IPv4 multicast packet to the IPv4 network connected to the interface whose IPv4 output information is reported to be set to "ON". Here, because the IPv4 output information for the interface 9 in the IP multicast path information table 51 is set to "ON", the IPv4 multicast packet is issued to the IPv4 network 112.

The IPv4 multicast router 106 receives the IPv4 multicast packet (destination: 238.0.0.1) issued from the conversion device 1 to the IPv4 network 112. In the network system shown in FIG. 11, however, the IPv4 network 114 has no member of the IPv4 multicast group specified by the IPv4 multicast address (238.0.0.1). Hence, the IPv4 multicast router 106 discards the IPv4 multicast packet without forwarding it to the IPv4 network 114.

Next, the IP transmission/reception module 2, the IP address conversion information holding module 4 and the IP header conversion module 5 perform (steps 210-213) to generate an IPv6 multicast packet from the IPv4 multicast packet.

The IP transmission/reception module 2 performs (step 214) to issue the generated IPv6 multicast packet to the IPv6 network connected to the interface whose IPv6 output information in the IP multicast path information table 51 notified by the IP multicast routing control information management module 6 in (step 208) is set to "ON". In this stage of explanation, because the IPv6 output information for the interfaces 10, 11 in the IP multicast path information table 51 is set to "ON", the IPv6 multicast packet is issued to the IPv6 networks 121, 122.

The IPv6 multicast router 107 receives the IPv6 multicast packet issued from the conversion device 1 to the IPv6 network 121. In the network system shown in FIG. 11, however, there is no member of the IPv6 multicast group on the IPv6 network 123. So, the IPv6 multicast router 107 discards the IPv6 multicast packet without forwarding it to the IPv6 network 123.

Similarly, the IPv6 multicast router 108 receives the IPv6 multicast packet issued from the conversion device 1 to the IPv6 network 122. In the network system of FIG. 11, however, there is no member of the IPv6 multicast group on the IPv6 network 124. So, the IPv6 multicast router 108 discards the IPv6 multicast packet without forwarding it to the IPv6 network 124.

Next, we will discuss the processing performed by the conversion device 1 that has received from the IPv6 multicast router 108 a PIM-Prune message requesting that the routing of the IPv6 multicast packet (destination: ff1e::238.0.0.1) to the IPv6 network 122 be stopped. The PIM-Prune message is a message transferred among routers which, by specifying an IP multicast address, or the destination address of the IP multicast packet, requests the routers relaying the IP multicast packet to stop routing the IP multicast packet using the IP multicast address.

Figure 19:
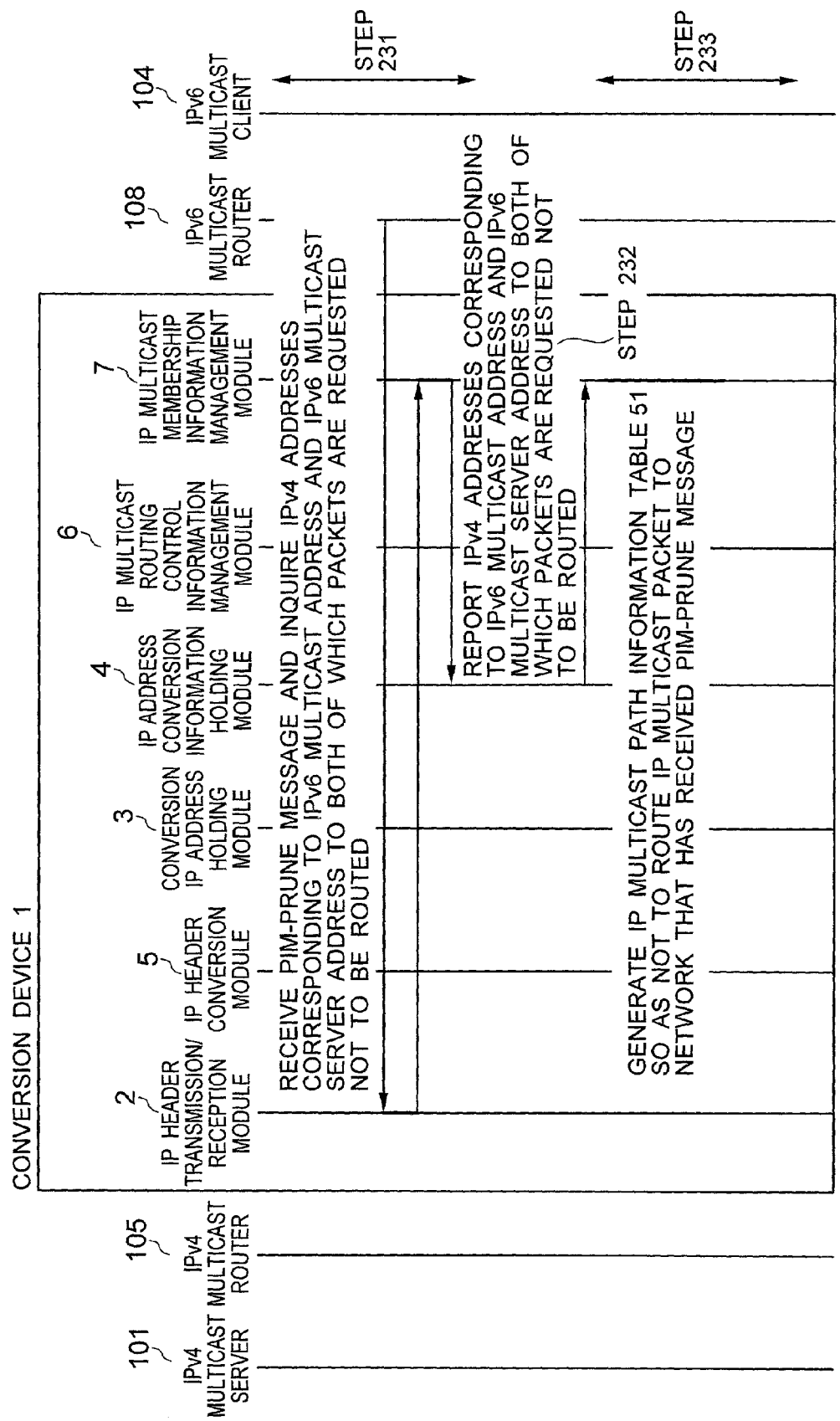
FIG. 19 is a communication sequence diagram for steps 231-233.

FIG. 19 is a communication sequence diagram for steps 231-233. In step 231, the IP transmission/reception module 2 transfers the PIM-Prune message received from the IPv6 multicast router 108 to the IP multicast routing control information management module 6. The IP multicast routing control information management module 6 refers to the IP address conversion information holding module 4 for the IPv4 addresses corresponding to the IPv6 multicast address and the IPv6 multicast server address which are required by the PIM-Prune message not to be routed to the IPv6 network 122.

The IP address conversion information holding module 4 checks if the IPv6 multicast address (ff1e::238.0.0.1) requested not to be routed to the IPv6 network 122 is registered in the IP address conversion table 41. If the IPv6 multicast address is already registered, the IP address conversion information holding module 4 reports the IPv4 address corresponding to the IPv6 multicast address to the source of inquiry (here, IP multicast routing control information management module 6). If the IPv6 multicast address (ff1e::238.0.0.1) is not registered in the IP address conversion table 41, the IP address conversion information holding module 4 matches the IPv6 multicast address to the IPv4 address (238.0.0.1) which is obtained by eliminating the fixed data, for example the IPv6 multicast prefix (ff1e::/96), from the IPv6 multicast address, registers them in the IP address conversion table 41, and reports them to the IP multicast routing control information management module 6. The fixed data to be removed from the IPv6 multicast address is not limited to the IPv6 multicast prefix (ff1e::/96).

Next, the IP address conversion information holding module 4 checks whether the IPv6 multicast server address (4::100) requested not to be routed to the IPv6 network 122 is registered in the IP address conversion table 41. If the server address is already registered, the IP address conversion information holding module 4 reports the IPv4 address saved in the table in combination with the matching the IPv6 multicast server address to the source of inquiry (here, the IP multicast routing control information management module 6). When the IPv6 multicast server address (4::100) is not registered, the IP address conversion information holding module 4 retrieves an IPv4 unicast address held in the IPv4 unicast address table 31 of the conversion IP address holding module 3. Then, the IP address conversion information holding module 4 matches the retrieved IPv4 unicast address to the IPv6 multicast server address (4::100), registers them in the IP address conversion table 41 and then reports the IPv4 unicast address to the IP multicast routing control information management module 6. In this stage of explanation, because the IPv4 address (133.144.93.2) and the IPv6 multicast server address (4::100) are matched to each other and registered in the IP address conversion table 41, the IPv4 address of (133.144.93.2) is reported.

The IP multicast routing control information management module 6 sets to "OFF" the IPv6 output for the interface, that has received the PIM-Prune message, in that entry in the IP multicast path information table 51 which has an IPv6 multicast address of (ff1e::238.0.0.1) and an IPv6 multicast server address of (4::100). Further, the IP multicast routing control information management module 6 sets to "OFF" the IPv6 output for the interface, that has received the PIM-Prune message, in that entry in the IP multicast path information table 51 whose IP multicast address is the IPv4 address (238.0.0.1) reported from the IP address conversion information holding module 4 and whose IP multicast server address is the reported IPv4 address (133.144.93.2). That is, in this stage of explanation, the IPv6 output in the IP multicast path information table 51 is set to "OFF" for the interface 11 that has (238.0.0.1) as the IP multicast address and (133.144.93.2) as the multicast server address.

Figure 20:
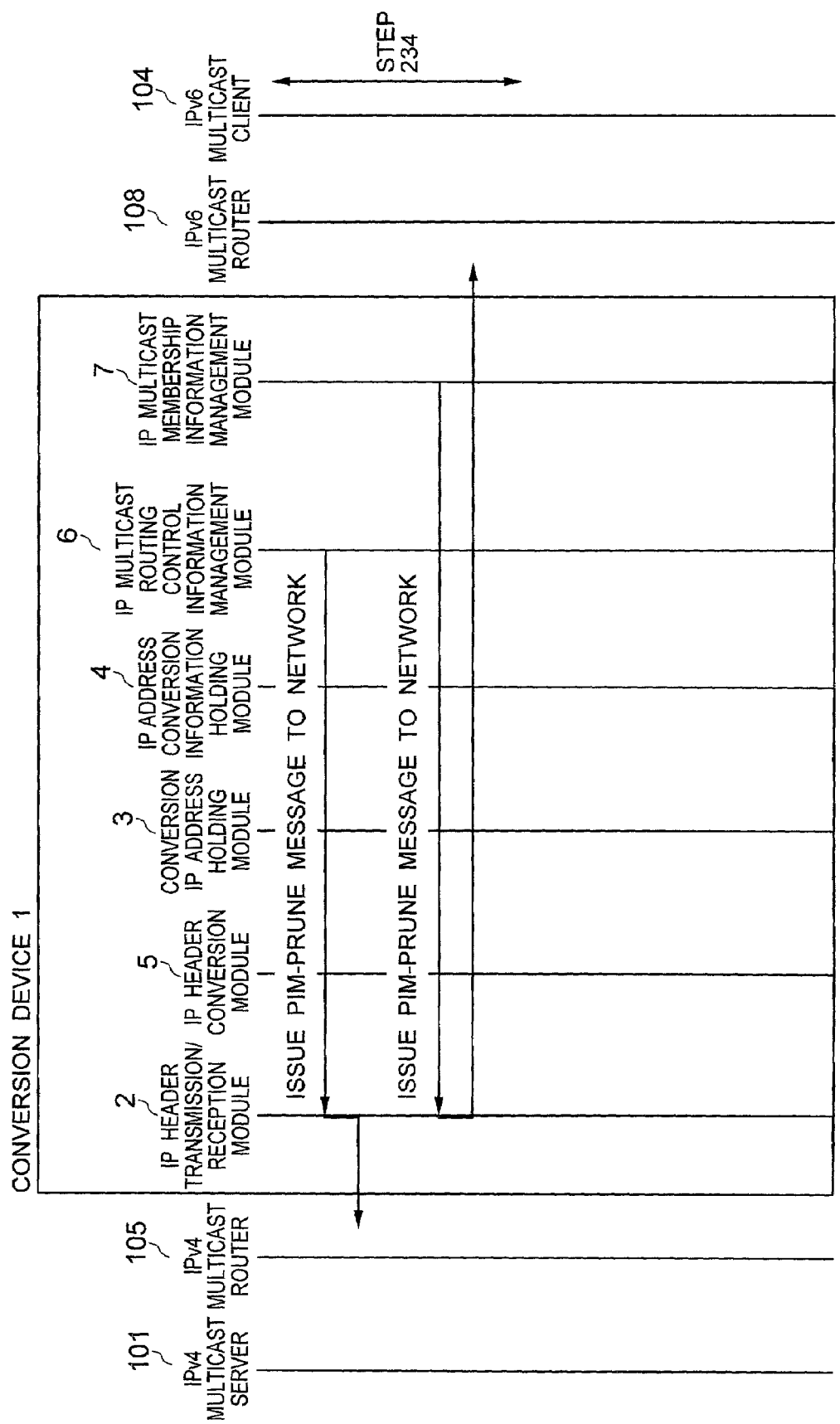
FIG. 20 is a communication sequence diagram for step 234.

FIG. 20 is a communication sequence diagram for step 234. In step 234, when as a result of (step 233) there is an entry in the IP multicast path information table 51 in which both the IPv4 output and the IPv6 output are "OFF" for all interfaces, the IP multicast routing control information management module 6 generates a PIM-Prune message requesting a multicast router not to forward the IP multicast packet of that entry. Then, the IP multicast routing control information management module 6 instructs the IP transmission/reception module 2 to issue the PIM-Prune message to the network that has a multicast router which forwards the multicast packet from the multicast server to the conversion device 1. On receiving this instruction, the IP transmission/reception module 2 issues the PIM-Prune message to the specified network. In this stage of explanation, because as a result of (step 233) there is no path in the IP multicast path information table 51 in which both the IPV4 output and IPV6 output are "OFF" for all interfaces, the PIM-Prune message is not issued.

When it receives a PIM-Prune message from the IPv6 multicast router 107 requesting that the forwarding of the IPv6 multicast packet (destination: ff1e::238.0.0.1) to the IPv6 network 121 be stopped or a PIM-Prune message from the IPv4 multicast router 106 requesting that the forwarding of the IPv4 multicast packet (destination: 238.0.0.1) to the IPv4 network 112 be stopped, the conversion device 1 performs the processing similar to (steps 231-234).

When it receives the PIM-Prune message from all the networks connected, the conversion device 1 performs (step 233) to set to "OFF" the IPv4 output and IPv6 output for all interfaces in that entry in the IP multicast path information table 51 in which (238.0.0.1) is registered as the IP multicast address and the address of the IPv4 multicast server 101 (133.144.93.2) is registered as the IP multicast server address. The IP multicast routing control information management module 6 then generates an PIM-Prune message requesting that the forwarding of the IP multicast packet on that path be stopped and instructs the IP transmission/reception module 2 to issue the PIM-Prune message to the IPv4 network 111 which has an upstream router on the path from the conversion device 1 to the IPv4 multicast server 101, i.e., in the case of the network of FIG. 11, the next pop router of the IP multicast server address (133.144.93.2), or the IPv4 multicast router 105. Then, the IP transmission/reception module 2 issues the PIM-Prune message to the specified network.

The PIM-Prune message is received by the IPv4 multicast router 105. After this, the IPv4 multicast router 105 no longer forwards the IPv4 multicast packet with the destination address of (238.0.0.1) and the source address of (133.144.93.2) to the IPv4 network 111.

Next, a case where the IPv6 multicast client 104 becomes a member of the IPv6 multicast group (ff1e::238.0.0.1) will be described.

The IPv6 multicast client 104 generates, according to the MLD protocol, an MLD Report message to become a member of the IPv6 multicast group (ff1e::238.0.0.1). When it receives the MLD Report message from the IPv6 network 124, the IPv6 multicast router 108 generates, according to the MLD protocol and PIM-DM protocol, a PIM Graft message requesting a router to forward a IPv6 multicast packet with a destination address of (ff1e::238.0.0.1) to the IPv6 network 124. The PIM Graft message is a message which, by specifying the IP multicast address, or the destination address of the IP multicast packet, requests a router forwarding the IP multicast packet to forward an IP multicast packet using that IP multicast address.

Figure 21:
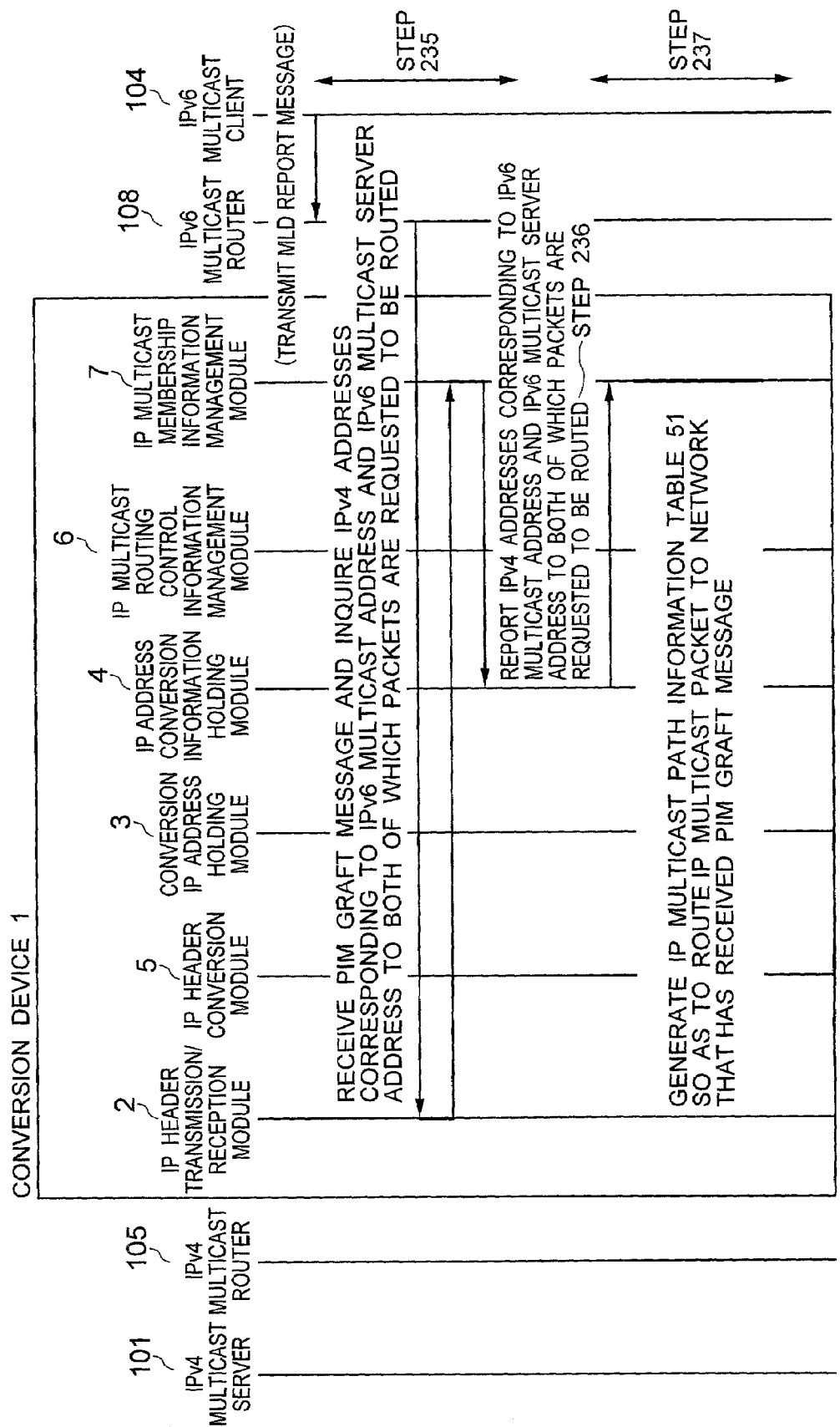
FIG. 21 is a communication sequence diagram for steps 235-237.

Here, we will described the processing performed by the conversion device 1 that has received the PIM Graft message from the IPv6 network 122. FIG. 21 is a communication sequence diagram for steps 235-237. Let us first explain about step 235. The IP transmission/reception module 2 receives the PIM Graft message issued from the IPv6 multicast router 108 and transfers it to the IP multicast routing control information management module 6. The IP multicast routing control information management module 6 refers to the IP address conversion information holding module 4 for the IPv4 addresses corresponding to the IPv6 multicast address and the IP multicast server address, both of which are requested by the PIM Graft message to be forwarded to the IPv6 network 122.

Next, step 236 will be explained. The IP address conversion information holding module 4 checks if the IPv6 multicast address (ff1e::238.0.0.1) requested to be forwarded to the IPv6 network 122 is registered in the IP address conversion table 41. If the IPv6 multicast address is already registered, the IP address conversion information holding module 4 reports the IPv4 multicast address saved in the table in combination with the matching IPv6 multicast address to the source of inquiry (here, IP multicast routing control information management module 6). When the IPv6 multicast address (ff1e::238.0.0.1) is not registered, the IP address conversion information holding module 4 matches the IPv6 multicast address (ff1e:238.0.0.1) to the IPv4 address (238.0.0.1) which is obtained by eliminating the fixed data, for example the IPv6 multicast prefix (ff1e::/96), from the IPv6 multicast address, registers them in the IP address conversion table 41, and reports them to the IP multicast routing control information management module 6. The fixed data to be removed from the IPv6 multicast address is not limited to the IPv6 multicast prefix of (ff1e::/96).

Next, the IP address conversion information holding module 4 checks whether the IPv6 multicast server address (4:: 100) requested to be forwarded to the IPv6 network 122 is registered in the IP address conversion table 41. If the server address is already registered, the IP address conversion information holding module 4 reports the IPv4 address saved in the table in combination with the matching the IPv6 multicast server address to the source of inquiry (here, the IP multicast routing control information management module 6). When the IPv6 multicast server address is not registered, the IP address conversion information holding module 4 retrieves an IPv4 unicast address from the conversion IP address holding module 3. Then, the IP address conversion information holding module 4 matches the retrieved IPv4 unicast address to the IPv6 multicast server address, registers them in the IP address conversion table 41 and then reports the IPv4 unicast address to the source of inquiry (here, the IP multicast routing control information management module 6). In this stage of explanation, because the IPv6 multicast server address (4:: 100) is matched to the IPv4 address (133.144.93.2) and registered in the IP address conversion table 41, the IPv4 address of (133.144.93.2) is reported to the IP multicast routing control information management module 6.

Next, step 237 will be described. The IP multicast routing control information management module 6 sets to "ON" the IPv6 output for the interface, that has received the PIM Graft message, in that entry in the IP multicast path information table 51 which has an IPv6 multicast address of (ff1e:: 238.0.0.1) and an IPv6 multicast server address of (4::100). Further, the IP multicast routing control information management module 6 sets to "ON" the IPv6 output for the interface, that has received the PIM Graft message, in that entry in the IP multicast path information table 51 which is registered with the IPv4 address (238.0.0.1) reported from the IP address conversion information holding module 4 and with the reported IPv4 address (133.144.93.2). In this stage of explanation, the IPv6 output for the interface 11 in an entry which has an IPv4 address of (238.0.0.1) and an IPv4 address of (133.144.93.2) is set to "ON".

Figure 22:
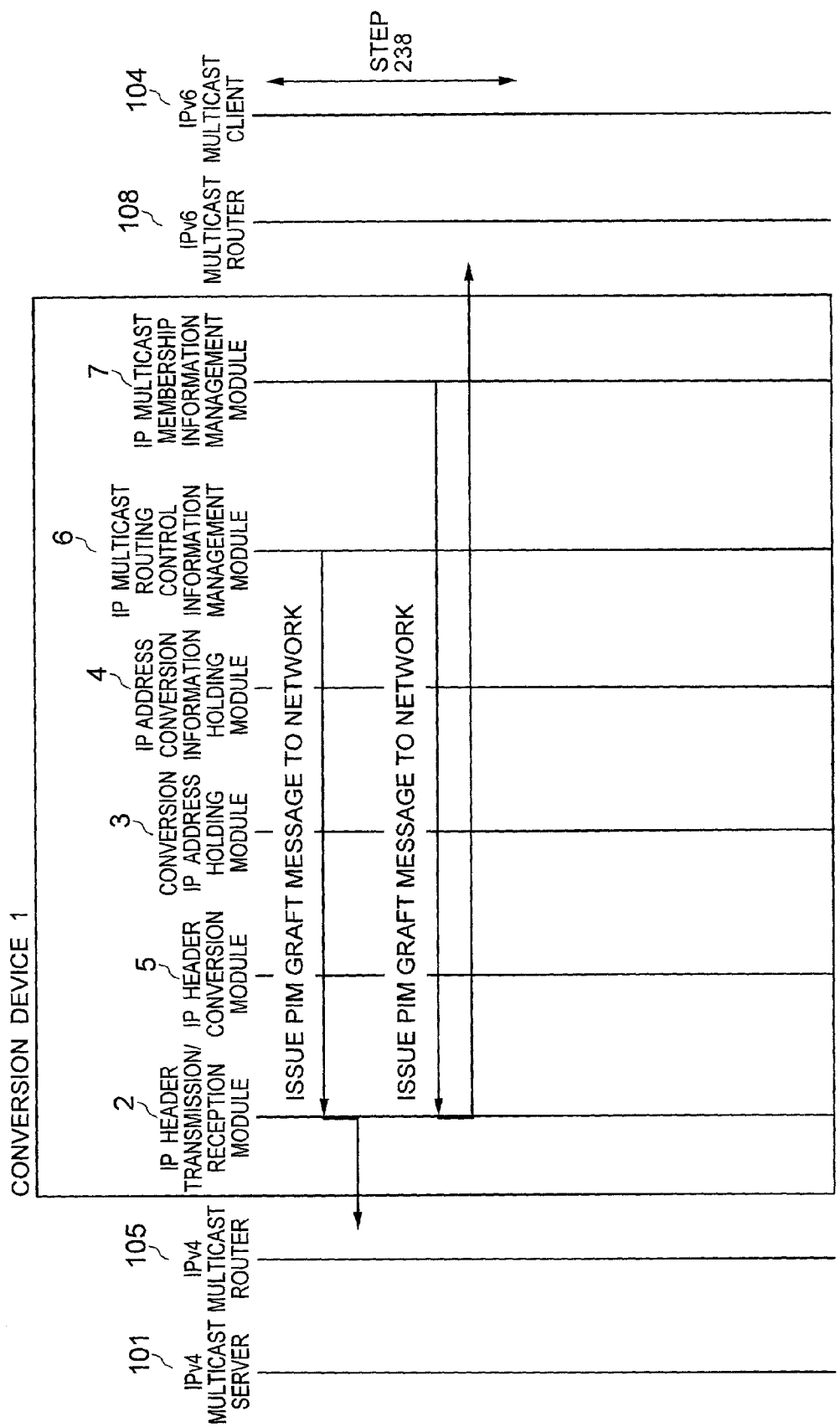
FIG. 22 is a communication sequence diagram for step 238.

FIG. 22 is a communication sequence diagram for step 238. In step 238, if as a result of (step 237) there is any path for which the IPv4 output or IPv6 output in the IP multicast path information table 51 is "ON", the IP multicast routing control information management module 6 generates a PIM Graft message requesting a router to forward an IP multicast packet on that path.

In this explanation, as a result of (step 237), the IPv6 output for the interface 11 in that entry in the IP multicast path information table 51 whose IP multicast address is (238.0.0.1) and IP multicast server address is (133.144.93.2) is set to "ON". Hence, the IP multicast routing control information management module 6 generates a PIM Graft message requesting a router to forward an IPv4 multicast packet with an destination address of (238.0.0.1) and a source address of (133.144.93.2) to the IPv4 network 111. Then, the IP multicast routing control information management module 6 instructs the IP transmission/reception module 2 to issue the PIM Graft message to the IPv4 network 111 which has an upstream router on the path from the conversion device 1 to the IPv4 multicast server 101, i.e., in the case of the network of FIG. 11, the next pop router of the IPv4 multicast server address (133.144.93.2), or the IPv4 multicast router 105. The IP transmission/reception module 2 then issues the PIM Graft message to the specified network.

The PIM Graft message is received by the IPv4 multicast router 105. After this, the IPv4 multicast router 105 forwards to the IPv4 network 111 an IPv4 multicast packet that has the IPv4 multicast address (238.0.0.1) as the destination address and the IPv4 multicast server address (133.144.93.2) as the source address.

Next, a case where the IPv6 multicast client 104 leaves the IPv6 multicast group (ff1e::238.0.0.1) will be explained.

The IPv6 multicast client 104 generates, according to the MLD protocol, an MLD Done message for leaving the IPv6 multicast group (ff1e::238.0.0.1) and issues it to the IPv6 network 124. Upon receiving the MLD Done message from the IPv6 network 124, the IPv6 multicast router 108 generates, according to the MLD protocol and PIM-DM protocol, a PIM-Prune message requesting a router not to forward an IPv6 multicast packet with the destination address of (ff1e:: 238.0.0.1) to the IPv6 network 124 and issues the generated PIM-Prune message to the IPv6 network 122.

The conversion device 1, when it receives the PIM-Prune message from the IPv6 network 122, performs (steps 231-234) to stop the routing. If there are no other networks that require the IPv6 multicast packet with the destination address of (ff1e::238.0.0.1) to be forwarded, the conversion device 1 generates a PIM-Prune message calling for the suspension of routing and issues the generated PIM-Prune message to the upstream router on the path, or the IPv4 multicast router 105. After this, the IPv4 multicast router 105 no longer forwards the IPv4 multicast packet transmit by the IPv4 multicast server 101 to the IPv4 network 111.

In the explanation above, we have described a case where an IPv4 multicast packet with an IPv4 multicast address (238.0.0.1) transmit by the IPv4 multicast server 101 is received by the IPv6 multicast client 104. Performing the similar processing also allows an IPv6 multicast packet with an IPv6 multicast address (ff1e::238.0.0.2) transmit by the IPv6 multicast server 103 to be received by the IPv4 multicast client 102.

Further, in the explanation above, we have described a case where the conversion from the IPv4 multicast packet transmit by the IPv4 multicast server 101 into the IPv6 packet is done by adding a fixed pattern to the higher order place of the IPv4 destination address (238.0.0.1) to obtain a converted 128-bit IPv6 address, for example (ff1e::ffff.238.0.0.1). Other methods may be used. For example, it is possible to hold in advance in the conversion IP address holding module 3 the IPv4 multicast address and IPv6 multicast address used for IP header conversion in addition to the IPv4 unicast address and IPv6 unicast address and to retrieve the converted IPv6 multicast address, for example (ff1e::100), from the conversion IP address holding module 3. Further, the conversion device may communicate with the DHCP server to automatically retrieve unused addresses and hold them in the conversion IP address holding module 3.

In the embodiment above, we have described a case where the conversion device 1 reflects on the IPv6 multicast routing control information the IPv4 multicast routing control information obtained from the adjoining IPv4 multicast router and then exchanges this IPv6 multicast routing control information with the adjoining IPv6 multicast router to forward the IP multicast packet transmit by the IPv6 multicast server 103 to the IPv4 multicast client 102. We have also described a case where the conversion device 1 reflects on the IPv4 multicast routing control information the IPv6 multicast routing control information obtained from the adjoining IPv6 multicast router and then exchanges this IPv4 multicast routing control information with the adjoining IPv4 multicast router to forward the IP multicast packet transmit by the IPv4 multicast server 101 to the IPv6 multicast client 104. The routing described above can also be achieved in other ways. For example, the IPv6 multicast routing control information necessary for forwarding the IP multicast packet transmit by the IPv6 multicast server 103 to the IPv4 multicast client 102 may be set in the conversion device 1 by an administrator. Alternatively, the IPv4 multicast routing control information necessary for forwarding the IP multicast packet transmit by the IPv4 multicast server 101 to the IPv6 multicast client 104 may be set in the conversion device 1 by an administrator.

Further, the IP address conversion information holding module 4 may delete those of the matching combinations of the IPv4 address and the IPv6 address which are not referenced for a predetermined period of time, and then return the deleted IPv4 unicast addresses and IPv6 unicast addresses to the conversion IP address holding module 3.

As described above, according to the present invention the IPv6 terminals can receive IP multicast packets transmit by the IPv4 terminals, and the IPv4 terminals can receive IP multicast packets transmit by the IPv6 terminals.

What is claimed is:

1. A method of routing each of a plurality of IPv4 multicast packets transmitted through an IPv4 network to a plurality of IPv6 networks, the method comprising the steps of:
   receiving from an arbitrary one of the plurality of IPv6 networks a message requesting a reception of an IPv6 multicast packet;
   when the IPv6 multicast packet, the reception of which has been requested, is generated by conversion of one of the plurality of IPv4 multicast packets,
   matching the arbitrary IPv6 networks that have transmitted the message with a part of header information of the one IPv4 multicast packet and storing them in memory, the arbitrary IPv6 networks being taken as a network requesting the reception of the IPv6 multicast packet;
   receiving one of the plurality of IPv4 multicast packets;
   converting the received IPv4 multicast packet into the IPv6 multicast packet including converting an IPv4 header of the received IPv4 multicast packet into an IPv6 header based on a relation between IPv4 multicast addresses and IPv6 multicast addresses and generating the IPv6 multicast packet; and
   transmitting the IPv6 multicast packet that was generated by the conversion to the IPv6 networks that were matched with a part of the header information of the received IPv4 multicast packet and which was stored in memory.

2. The method according to claim 1, further comprising the step of:
   transmitting to the plurality of IPv6 networks a message for checking the existence of a terminal requesting the reception of the IPv6 multicast packet.

3. The method according to claim 1, further comprising the steps of:
   receiving from a terminal connected to an arbitrary one of the plurality of IPv6 networks a message indicating that the reception of the IPv6 multicast packet is not required; and
   when a terminal requesting the reception of the IPv6 multicast packet no longer exists on the arbitrary one of the IPv6 networks,
   matching the arbitrary one of the IPv6 networks with a part of the header information and storing them in memory, the arbitrary one of the IPv6 networks being taken as a network not requiring the reception of the IPv6 multicast packet.

4. The method according to claim 1, further comprising the steps of:
   receiving from at least one IPv4 network a message requesting the reception of the one IPv4 multicast packet; and
   matching the at least one IPv4 network with a part of the header information and storing them in memory, the at least one IPv4 network being taken as a network transmitting the one IPv4 multicast packet.

5. The method according to claim 1, wherein the part of the header information includes a destination address of at least the one IPv4 multicast packet.

6. A method of relaying at least one IPv4 multicast packet to be transmitted via an IPv4 network to at least one IPv6 network, comprising the steps of:
   receiving a message requesting reception of an IPv6 multicast packet including an IPv6 multicast address as a destination address, from the at least one IPv6 network;
   storing the IPv6 network which transmits the message as a network requesting reception of the IPv6 multicast packet in correspondence with an IPv4 multicast address corresponding to the IPv6 multicast address;
   receiving an IPv4 multicast packet including an IPv4 multicast address as a destination address, from the at least one IPv4 network
   generating, from the IPv4 multicast packet, an IPv6 multicast packet which includes, as a destination address, the IPv6 multicast address corresponding to the IPv4 multicast address contained as a destination address in the IPv4 multicast packet; and
   transmitting the IPv6 multicast packet thus generated to the IPv6 network stored in correspondence with the IPv4 multicast address.

7. A method according to claim 6, wherein the IPv4 multicast address corresponding to the IPv6 multicast address is an address obtained by deleting a fixed pattern from the IPv6 multicast address.

8. A method according to claim 6, further comprising the step of:
   holding at least one IPv6 unicast address, wherein
   the step of generating includes a substep of converting an IPv4 unicast address contained as a transmission source address in the IPv4 multicast packet into an IPv6 unicast address of the least one IPv6 unicast address and generating an IPv6 multicast packet which includes the IPv6 unicast address thus converted as a transmission source address.

9. A method according to claim 8, wherein the step of holding includes a substep of retrieving an unused IPv6 unicast address from a DHC server and holding the unused IPv6 unicast address.

10. A method of relaying an IPv4 multicast packet transmitted from a first device which is coupled to a fist network and uses IPv4 as communication protocol to a second device which is coupled to a second network and uses IPv6 as communication protocol, comprising the steps of:
    receiving a message requesting reception of an IPv6 multicast packet including an IPv6 multicast address as a destination address, from the second device via the second network;
    storing the second network which transmits the message as a network requesting reception of the IPv6 multicast packet in correspondence with an IPv4 multicast address corresponding to the IPv6 multicast address;

receiving an IPv4 multicast packet including an IPv4 multicast address as a destination address, from the first device via the first network;

generating, from the IPv4 multicast packet, an IPv6 multicast packet which includes, as a destination address, the IPv6 multicast address corresponding to the IPv4 multicast address contained as a destination address in the IPv4 multicast packet; and transmitting the IPv6 multicast packet thus generated to the second network stored in correspondence with the IPv4 multicast address.

11. A method according to claim 10, wherein the IPv4 multicast address corresponding to the IPv6 multicast address is an address obtained by deleting a fixed pattern from the IPv6 multicast address.

12. A method according to claim 10, further comprising the step of:

holding at least one IPv6 unicast address, wherein the step of generating includes a substep of converting an IPv4 unicast address contained as a transmission source address in the IPv4 multicast packet into an IPv6 unicast address of the least one IPv6 unicast address and generating an IPv6 multicast packet which includes the IPv6 unicast address thus convened as a transmission source address.

13. A method according to claim 12, wherein the step of holding includes a substep of retrieving an unused IPv6 unicast address from a DHC server and holding the unused IPv6 unicast address.

* * * * *